US009885303B2

(12) United States Patent
Ishibashi et al.

(10) Patent No.: US 9,885,303 B2
(45) Date of Patent: Feb. 6, 2018

(54) CONTROL DEVICE FOR DIESEL ENGINE

(71) Applicant: NISSAN MOTOR CO., LTD., Yokohama-shi, Kanagawa (JP)

(72) Inventors: Yasutaka Ishibashi, Kanagawa (JP); Jin Yokoyama, Tokyo (JP); Keita Mitsushima, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 371 days.

(21) Appl. No.: 14/419,721

(22) PCT Filed: Aug. 7, 2013

(86) PCT No.: PCT/JP2013/071384
§ 371 (c)(1),
(2) Date: Feb. 5, 2015

(87) PCT Pub. No.: WO2014/024928
PCT Pub. Date: Feb. 13, 2014

(65) Prior Publication Data
US 2015/0198106 A1 Jul. 16, 2015

(30) Foreign Application Priority Data
Aug. 7, 2012 (JP) ................................ 2012-175105

(51) Int. Cl.
*F02D 41/10* (2006.01)
*F02D 41/00* (2006.01)
(Continued)

(52) U.S. Cl.
CPC .......... *F02D 41/10* (2013.01); *F02B 29/0406* (2013.01); *F02D 23/02* (2013.01);
(Continued)

(58) Field of Classification Search
CPC ...... F02D 41/10; F02D 23/02; F02D 41/0007; F02D 41/005; F02D 41/045; F02D 41/18;
(Continued)

(56) References Cited

U.S. PATENT DOCUMENTS

| 7,107,770 | B2 * | 9/2006 | Shirakawa | .......... F02D 41/0007 |
| | | | | 123/305 |
| 2005/0081835 | A1 * | 4/2005 | Larson | .................... F02D 23/02 |
| | | | | 123/568.11 |

(Continued)

FOREIGN PATENT DOCUMENTS

| JP | 2001-132463 A | 5/2001 |
| JP | 2002-371919 A | 12/2002 |

(Continued)

*Primary Examiner* — Thomas Moulis
*Assistant Examiner* — John Bailey
(74) *Attorney, Agent, or Firm* — Drinker Biddle & Reath LLP

(57) ABSTRACT

A control device for a diesel engine includes a variable geometry supercharger with a variable supercharge pressure mechanism and an EGR valve configured to adjust an EGR gas amount. In the control device, when the diesel engine is determined to be accelerating, a maximum exhaust pressure is set such that an increased amount of an engine torque by increasing a fuel injection amount in association with acceleration is greater than an increased amount of pumping loss increased with increasing exhaust pressure due to an actuation of the variable supercharge pressure mechanism in association with acceleration. A target control variable for the variable supercharge pressure mechanism and a target control variable for the EGR valve are controlled on the basis of the maximum exhaust pressure.

8 Claims, 20 Drawing Sheets

(51) Int. Cl.
| | | |
|---|---|---|
| *F02D 41/30* | (2006.01) | |
| *F02D 23/02* | (2006.01) | |
| *F02D 41/04* | (2006.01) | |
| *F02D 41/18* | (2006.01) | |
| *F02B 29/04* | (2006.01) | |
| *F02M 26/05* | (2016.01) | |
| *F02M 26/23* | (2016.01) | |
| *F02B 37/24* | (2006.01) | |
| *F02M 35/10* | (2006.01) | |

(52) U.S. Cl.
CPC ....... *F02D 41/005* (2013.01); *F02D 41/0007* (2013.01); *F02D 41/045* (2013.01); *F02D 41/18* (2013.01); *F02D 41/30* (2013.01); *F02M 26/05* (2016.02); *F02M 26/23* (2016.02); *F02B 37/24* (2013.01); *F02B 2275/14* (2013.01); *F02D 2200/0406* (2013.01); *F02D 2200/602* (2013.01); *F02D 2250/34* (2013.01); *F02M 35/1038* (2013.01); *F02M 35/10386* (2013.01); *Y02T 10/123* (2013.01); *Y02T 10/144* (2013.01); *Y02T 10/146* (2013.01); *Y02T 10/47* (2013.01)

(58) Field of Classification Search
CPC ............. F02D 41/30; F02D 2200/0406; F02D 2200/602; F02D 2250/34; F02M 26/05; F02M 26/23; F02M 35/1038; F02M 35/10386; F02B 29/0406; F02B 37/24; F02B 2275/14; Y02T 10/123; Y02T 10/144; Y02T 10/146; Y02T 10/47
USPC ....... 123/326, 370, 436, 675, 682, 485, 492, 123/371, 493, 364, 565, 564, 559.3, 383, 123/677, 568.21, 568.22, 704, 330, 391, 123/683, 702, 344, 445, 478, 483, 484, 123/703, 568.11, 380, 382, 684, 494, 521, 123/349; 60/601, 603, 600, 602, 605.1, 60/607, 608, 611, 605.2, 599, 278; 701/103, 108; 73/114.24, 114.32, 114.33, 73/114.37, 114.34; 290/17; 340/606
See application file for complete search history.

(56) References Cited

U.S. PATENT DOCUMENTS

| | | | | |
|---|---|---|---|---|
| 2011/0040476 | A1* | 2/2011 | Ogawa | ................ F02B 25/145 701/108 |
| 2014/0250884 | A1* | 9/2014 | Ibuki | ..................... F02B 37/24 60/603 |
| 2014/0283514 | A1* | 9/2014 | Ibuki | ..................... F02D 23/02 60/605.2 |
| 2015/0007564 | A1* | 1/2015 | Yoshioka | .............. F02M 26/49 60/605.2 |
| 2015/0121862 | A1* | 5/2015 | Wade | ..................... F02B 37/22 60/602 |
| 2015/0337720 | A1* | 11/2015 | Cattani | .................. F02B 37/24 60/605.1 |

FOREIGN PATENT DOCUMENTS

| | | |
|---|---|---|
| JP | 2005-048738 A | 2/2005 |
| WO | WO-2013/057829 A1 | 4/2013 |

* cited by examiner

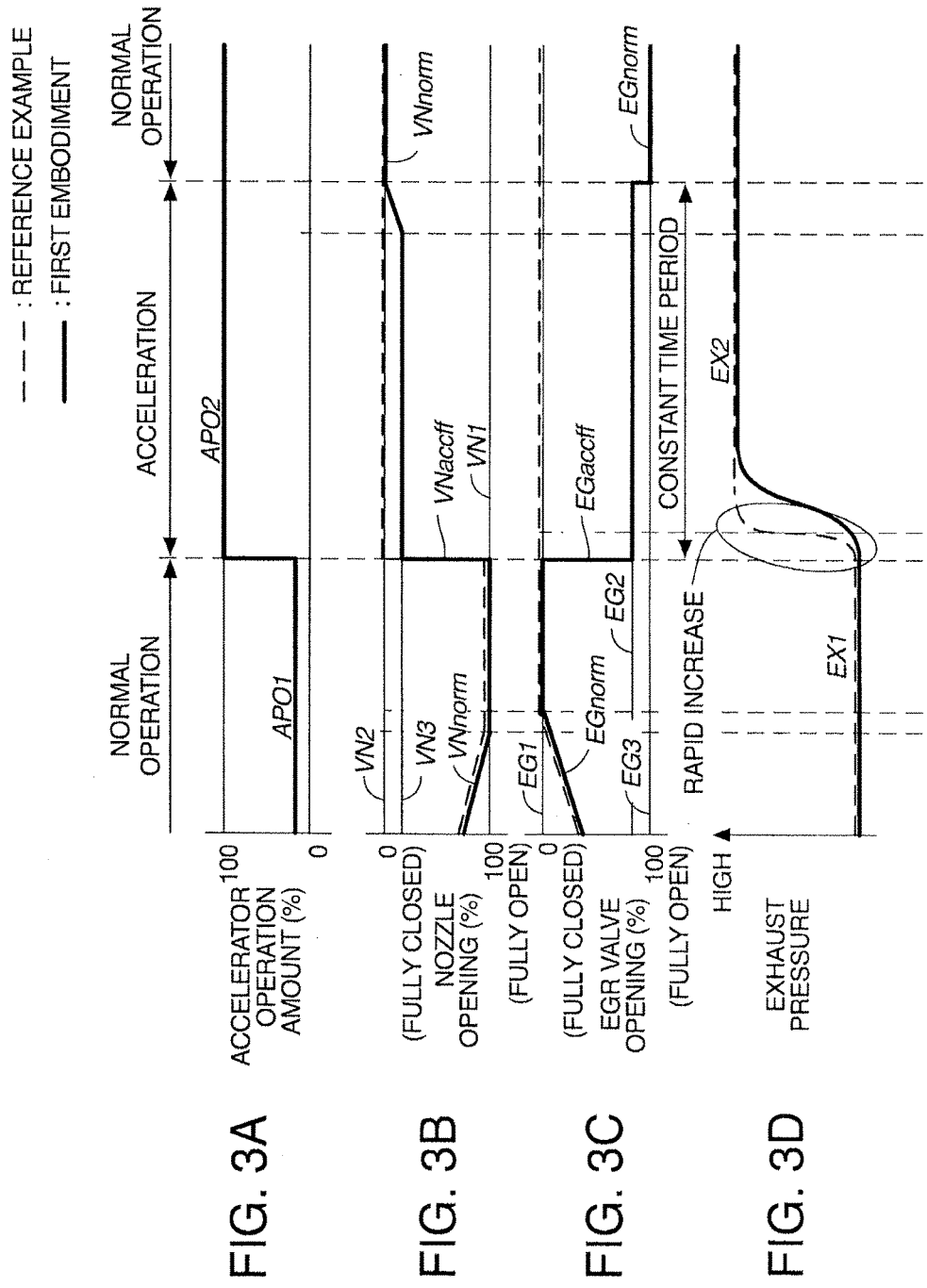

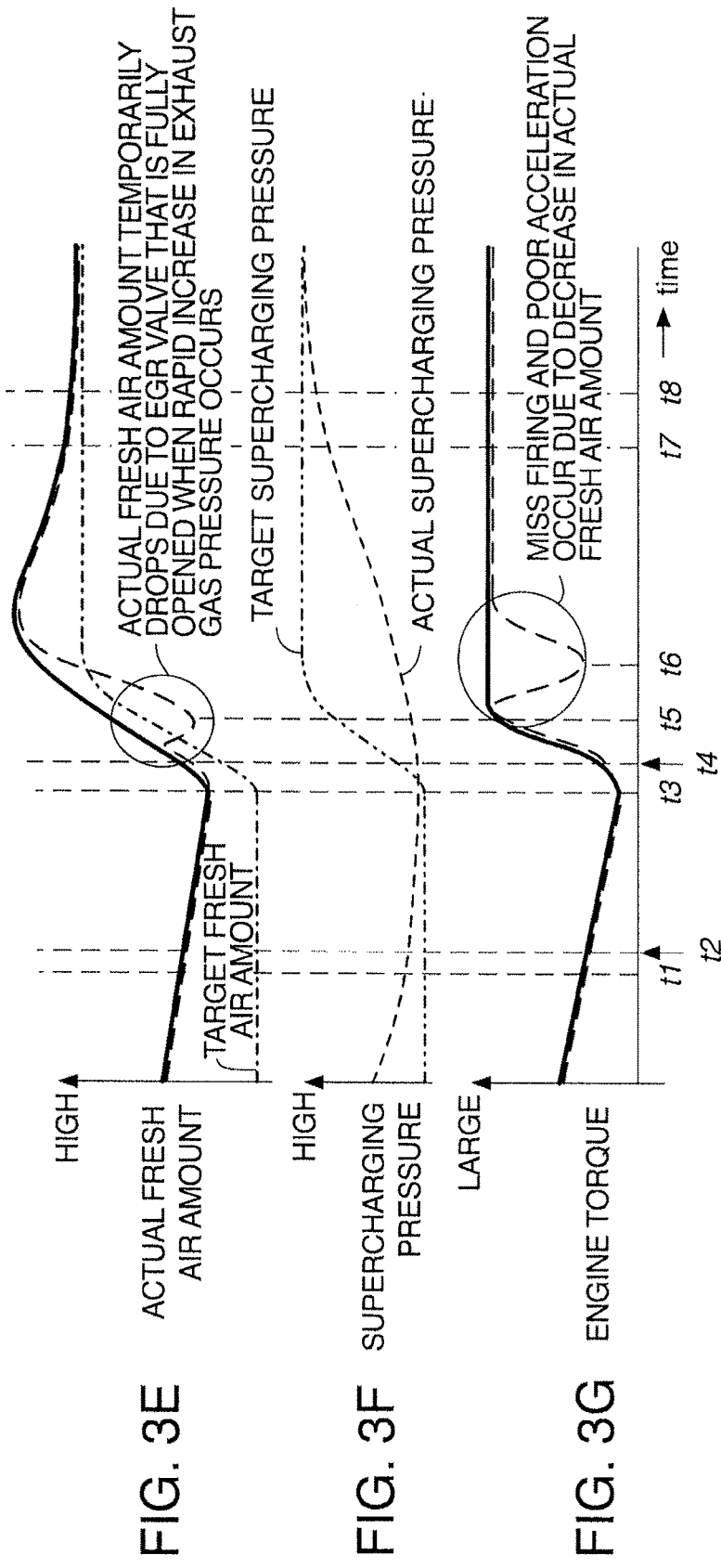

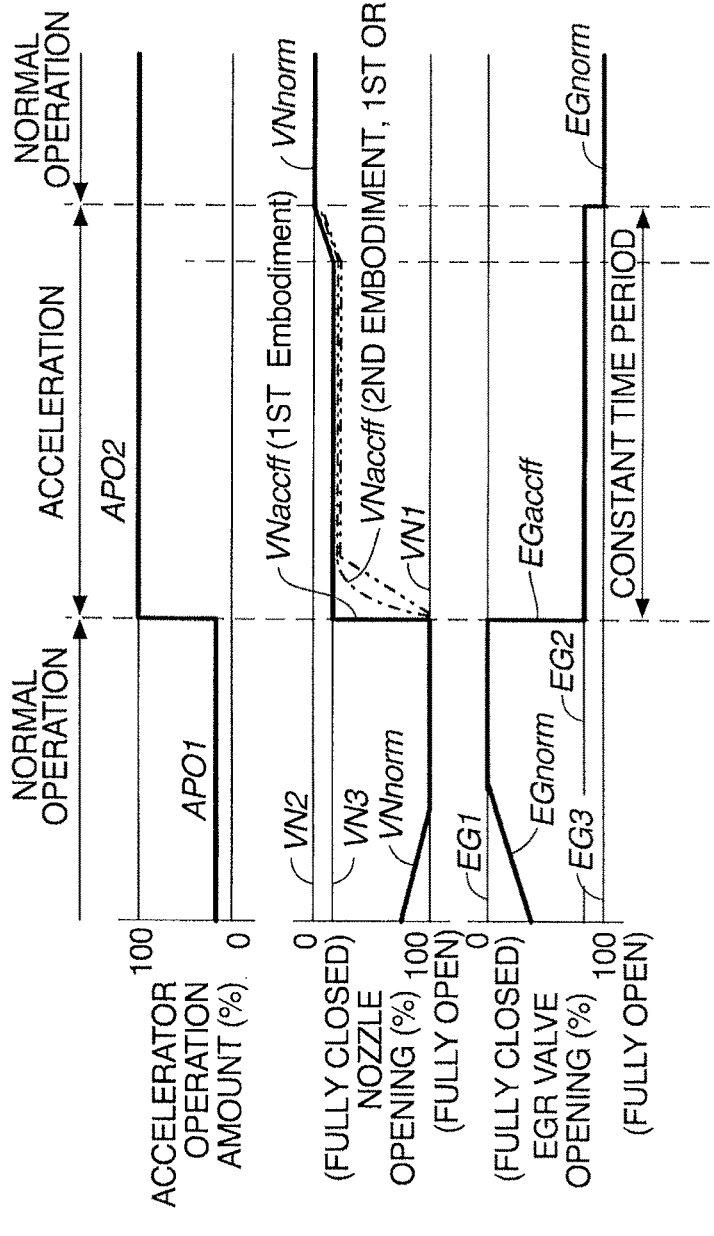

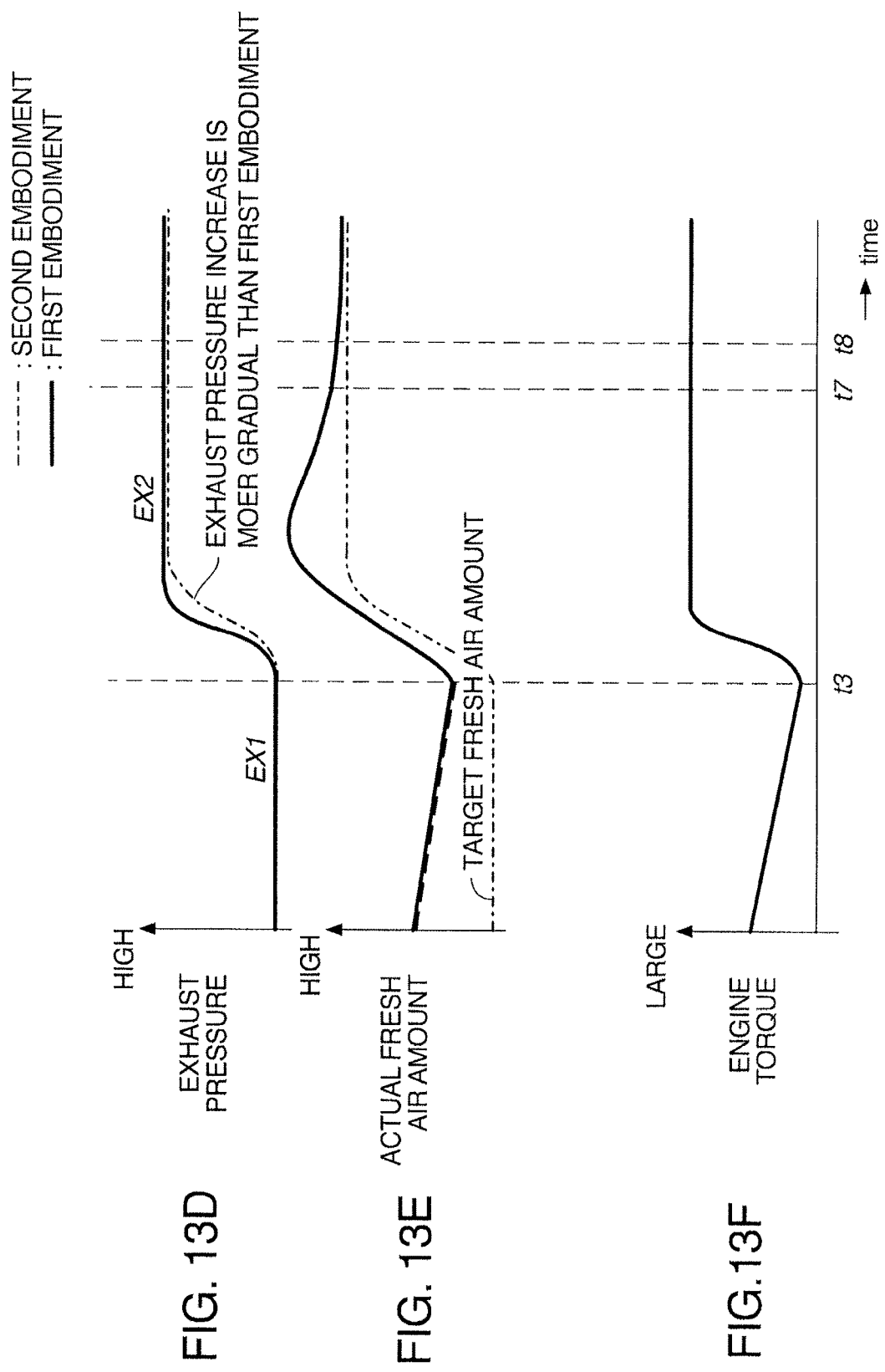

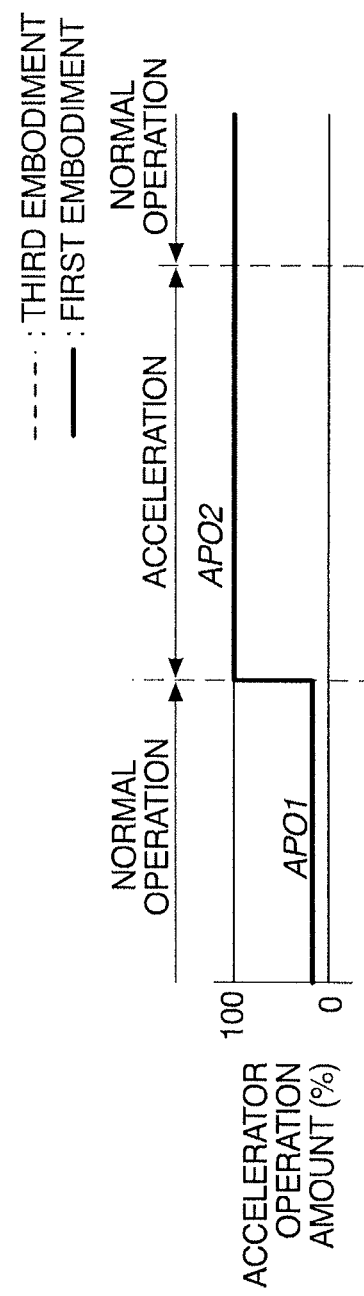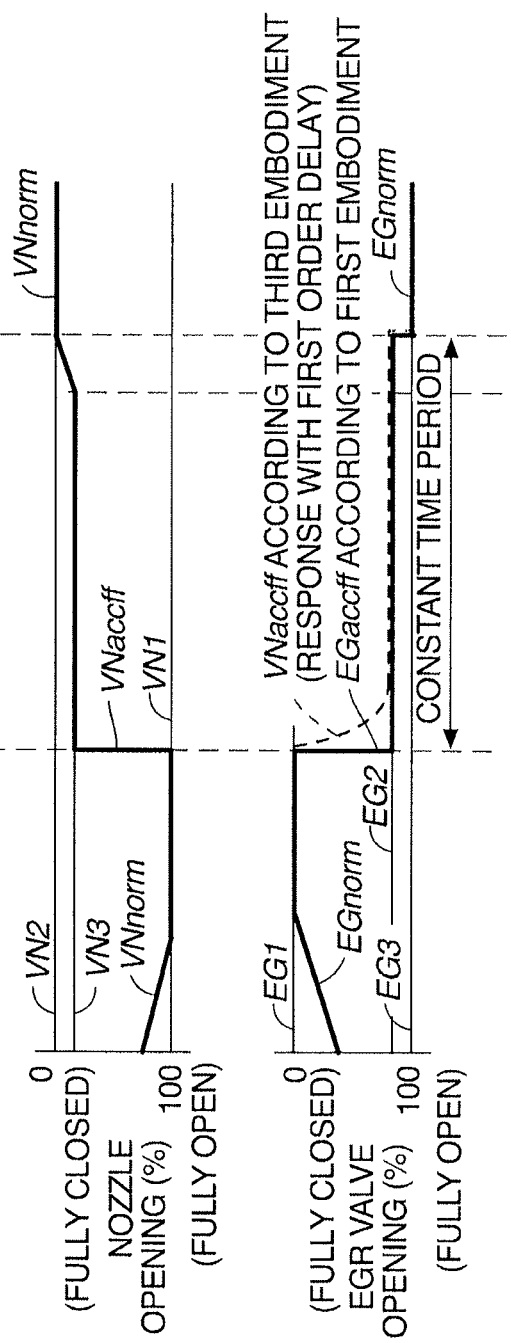

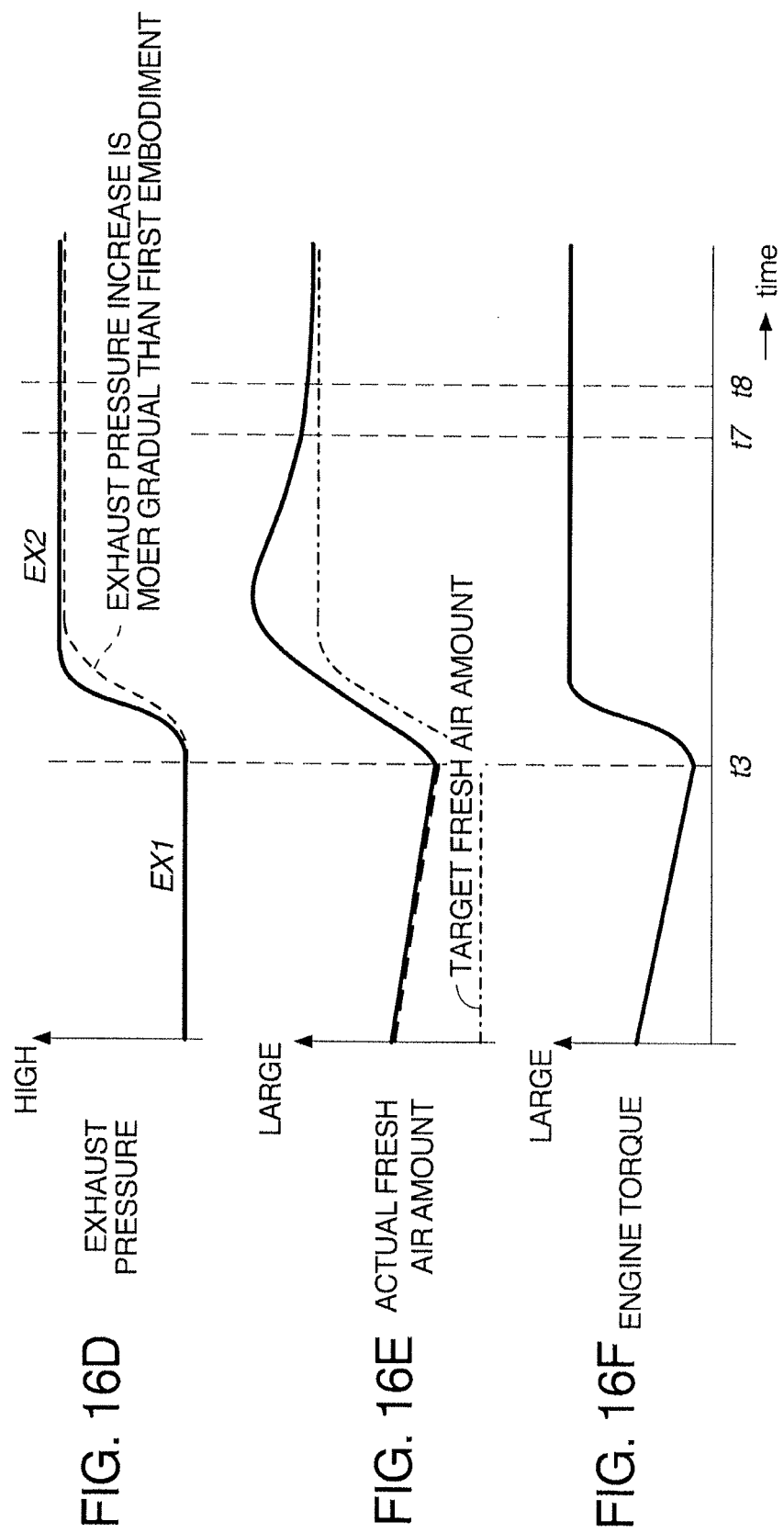

CONTROL DEVICE FOR DIESEL ENGINE

FIELD OF THE INVENTION

This invention relates to a control device for a diesel engine that includes a variable geometry supercharger with a variable nozzle and an exhaust gas recirculation (EGR) valve that adjusts EGR amount.

BACKGROUND OF THE INVENTION

JP2002-371919A, published by the Japan Patent Office in 2002, proposes the following technique. When the diesel engine is accelerating, the opening of a variable nozzle is set to be greater than the control value defined in a nozzle opening control map for a predetermined period. Also, the opening of an EGR valve is set to be greater than the set value on an EGR-valve opening control map.

SUMMARY OF THE INVENTION

According to this prior art, the EGR-valve opening is increased during acceleration. Accordingly, an increase in exhaust pressure due to the acceleration might cause an excessive amount of EGR that generates smoke or might cause combustion deterioration resulting in deterioration in drive ability.

This invention focuses on such problems in the prior art and an object of this invention is to provide a control device for a diesel engine that reduces generation of smoke without causing deterioration in acceleration performance.

A control device for a diesel engine according to this invention comprises a variable geometry supercharger with a variable supercharge pressure mechanism and an exhaust gas recirculation valve configured to adjust an exhaust gas recirculation amount. The control device is configured to, when the engine is determined to be an accelerating, set a maximum exhaust pressure that causes an increased amount of an engine torque by increasing a fuel injection amount in association with acceleration to be greater than an increased amount of pumping loss increased with increasing exhaust pressure due to an actuation of the variable supercharge pressure mechanism in association with the acceleration, and control a target value of a control variable for the variable supercharge pressure mechanism and a target value of a control variable for the exhaust gas recirculation valve on the basis of the maximum exhaust pressure.

BRIEF DESCRIPTION OF DRAWINGS

FIGS. 3A-3G are timing charts of parameters during acceleration of the diesel engine such as an accelerator position, a target nozzle opening, and a target EGR-valve opening according to the first embodiment of this invention and a reference example without invention.

FIGS. 13A-13F are timing charts of parameters during acceleration of the diesel engine such as the accelerator position, the target nozzle opening, and the target EGR-valve opening according to a second embodiment of this invention.

FIGS. 16A-16F are timing charts of parameters during acceleration of the engine such as the accelerator position, the target nozzle opening, and the target EGR-valve opening according to a third embodiment of this invention.

DESCRIPTION OF THE PREFERRED EMBODIMENTS

Referring to the accompanying drawings, embodiments of this invention will be described below.

First Embodiment

Figure 1:
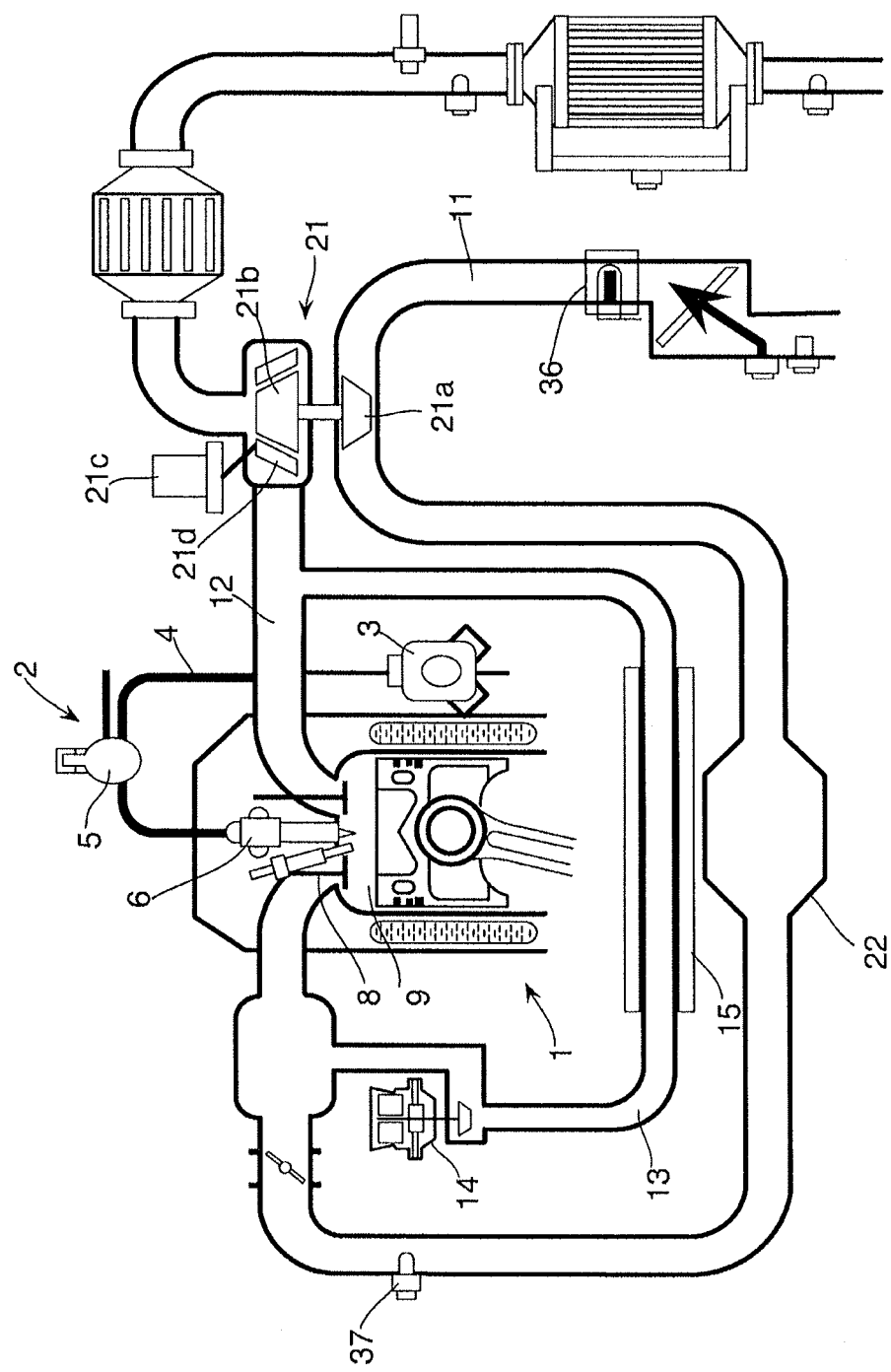
FIG. 1 is a schematic diagram of a control device for a diesel engine according to a first embodiment of this invention.

FIG. 1 is a schematic diagram of a control device for a diesel engine according to a first embodiment of this invention.

A diesel engine 1 for a vehicle comprises a common-rail fuel injection device 2. The common-rail fuel injection device 2 comprises a supply pump 3, a common rail 5, and fuel injectors 6 corresponding to the number of cylinders of the diesel engine 1. The supply pump 3 applies pressure on fuel and transfers the fuel to the common rail 5 via a fuel supply passage 4. The common rail 5 stores the fuel so as to cause high-pressure fuel. The fuel injectors 6 corresponding to the number of cylinders distribute and supply the high-pressure fuel to the diesel engine 1. Each fuel injector 6 has a three-way valve constituted by a solenoid valve not illustrated. When the three-way valve is an OFF state, a needle-like valve body is in a seated state. When the three-way valve is an ON state, the needle-like valve body is separated from the seat and the three-way valve injects fuel. That is, the fuel injection amount is adjusted by the ON time of the three-way valve. When the pressure within the common rail 5 is constant, the fuel injection amount is greater as the ON time is longer.

The diesel engine 1 further comprises an exhaust gas recirculation (EGR) device. The EGR device comprises an EGR valve 14 and an EGR cooler 15 installed in an EGR passage 13. The EGR passage 13 is a passage that recirculates a part of the exhaust gas in an exhaust passage 12 to an intake passage 11. The EGR passage 13 is branched from the exhaust passage 12, and joins the intake passage 11 at a downstream of an intake throttle. The EGR valve 14 is disposed in the middle of the EGR passage 13, and adjusts a flow rate of the exhaust gas or the EGR gas flowing through the EGR passage 13. The opening of the EGR valve 14 is adjusted by a rotation of a step motor. The flow rate of the EGR gas increases and decreases depending on the opening of the EGR valve 14. The EGR cooler 15 is disposed in the middle of the EGR passage 13, and cools the EGR gas flowing through the EGR passage 13.

The diesel engine 1 further comprises a variable geometry turbocharger 21. The variable geometry turbocharger 21 comprises an intake compressor 21*a* and an exhaust turbine 21*b* that are coaxially disposed. The exhaust turbine 21*b* is disposed in the exhaust passage 12 at a downstream of a bifurcating portion of the EGR passage 13. A variable nozzle 21*d*, which is driven by a step motor 21*c*, is provided at a scroll inlet of the exhaust turbine 21*b*. The variable nozzle 21*d* is controlled to have a nozzle opening that increases the flow rate of the exhaust gas introduced into the exhaust turbine 21*b* in a low revolution range of the diesel engine 1. According to such a configuration, a predetermined supercharging pressure is obtained from the low revolution range. In a high revolution range of the diesel engine 1, the variable nozzle 21*d* is controlled to have the nozzle opening corresponding to, for example, the fully opened state that allows introducing the exhaust gas into the exhaust turbine 21*b* without resistance. In the middle of the intake passage 11, an intercooler 22 is disposed.

Figure 2:
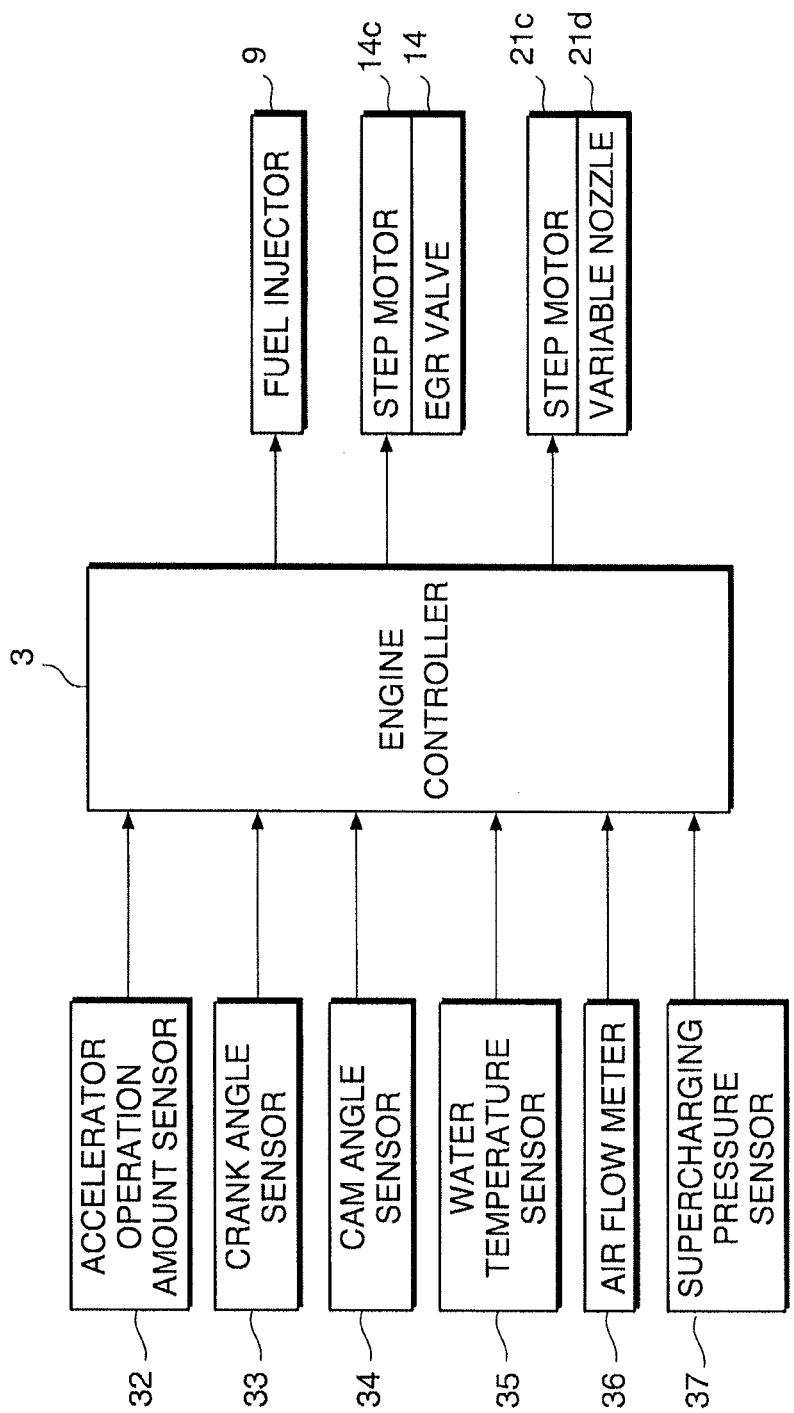
FIG. 2 is a block diagram illustrating an engine control system according to the first embodiment of this invention.

FIG. 2 is a block diagram illustrating an engine control system.

Signals are input into an engine controller 31 from an accelerator-operation-amount sensor 32, a crank angle sensor 33, a cam angle sensor 34, and a water temperature sensor 35. The accelerator-operation-amount sensor 32 detects a depression amount APO of an accelerator pedal with which the vehicle is provided. The crank angle sensor 33 detects an engine rotation speed and a crank angle. The cam angle sensor 34 detects a cam angle or a crank angle. The engine controller 31 computes a target fuel injection amount Qsol (milligram/stroke) corresponding to the engine rotation speed Ne and the accelerator operation amount APO, and controls the ON time of the above-described three-way valve corresponding to this target fuel injection amount Qsol.

A drive system of the variable nozzle 21*d* in which the step motor 21*c* varies the nozzle opening is applied in this embodiment. This invention is however not limited to this system. A drive systems using a diaphragm actuator, a drive system in which an electromagnetic solenoid adjusts a control negative pressure to a diaphragm actuator, and a drive system in which the variable nozzle 21*d* changes the nozzle opening according to an operation of a DC motor are also applicable as the drive system of the variable nozzle 21*d*.

In the case where a supercharging pressure control using the variable geometry turbocharger 21 and an EGR control using the EGR valve 14 are performed together, a change in a supercharging pressure causes a change in an exhaust pressure. Thus, an EGR gas amount also changes. In contrast, a change in the EGR gas amount causes a change in the supercharging pressure. Thus, the supercharging pressure and the EGR gas amount cannot be independently controlled. In some cases, both parameters disturb each other on the control. In other words, the supercharging pressure and the EGR gas amount affect each other. The change in the EGR gas amount requires the change in the nozzle opening. Therefore, appropriate adaptation is difficult. In particular, during a transition state, control accuracy for both parameters is decreased. According to JP2001-132463A, published by the Japan Patent Office in 2001, an engine controller 31 firstly computes a target intake-air amount tQac corresponding to an operation condition of an engine. Then, a target opening area ratio Rvnt of a variable nozzle 21*d* as the operation target value of a turbocharger 21 is set based on this target intake-air amount tQac, an actual EGR gas amount Qec, and an actual EGR rate Megrd. An opening area ratio of the variable nozzle 21*d* is a ratio of a current nozzle opening area to a nozzle opening area of the variable nozzle 21*d* in a fully-opened state. Accordingly, the opening area ratio is 100% in a fully-opened state and 0% in a fully-closed state of the variable nozzle 21*d*. It should be noted that the actual EGR gas amount Qec is the value obtained by delaying a target EGR gas amount Qec0. The actual EGR rate Megrd is the value obtained by delaying a target EGR rate Megr.

It should be noted that, in the following description, the nozzle opening of the variable nozzle 21*d* is used instead of the opening area ratio in accordance with the actual control processes of this embodiment. The nozzle opening is a parameter that becomes 100% in the fully-opened state and becomes 0% in the fully-closed state of the variable nozzle 21*d*. However, instead of the nozzle opening, the nozzle opening area or the nozzle opening area ratio may be used.

FIGS. 3A-3G illustrate the models of changes of the accelerator operation amount FIG. 3A, a target nozzle opening FIG. 3B, a target EGR-valve opening FIG. 3C, an exhaust pressure FIG. 3D, an actual fresh air amount FIG. 3E, and an engine torque FIG. 3G when the vehicle is decelerated until a time t3 and then the accelerator operation amount is set to a second predetermined value APO2 corresponding to the fully-opened state in a stepwise manner at the time 13 to accelerate the vehicle again. In each diagram, a bold solid line denotes the first embodiment of this invention. A broken line denotes a reference example without invention to be compared with the first embodiment of this invention. A single-dotted line in FIG. 3E denotes a target fresh air amount of the reference example. FIG. 3F illustrates a target supercharging pressure and an actual supercharging pressure of the reference example.

It should be noted that the "fresh air" is the intake air that is suctioned though an air cleaner and flows into the cylinder. That is, the "fresh air" is used as the concept that does not include the EGR gas. Accordingly, the "actual fresh air amount" is the air intake air amount that is suctioned through the air cleaner and actually flows into the cylinder.

Until the time t3, although the accelerator pedal is depressed, the accelerator operation amount is a small first predetermined value APO1 corresponding to deceleration. In this state, supercharge is not necessary. At this time, the target nozzle opening gradually increases and becomes a first predetermined value VN1 corresponding to the fully-opened state at a time t1. The target EGR-valve opening becomes a first predetermined value EG1 corresponding to the fully-opened state at a time t2 so as to realize the target fresh air amount.

After the time t3, the reference example will be described in advance. To ensure the actual fresh air amount by supercharging at the time t3, as illustrated by the broken line in FIG. 3B, the target nozzle opening is set to a second predetermined value VN2 corresponding to the fully-closed state. Accordingly, as illustrated by the broken line in FIG. 3D, the exhaust pressure sharply increases from a first predetermined value EX1 to a second predetermined value EX2 around a time t4. Accordingly, the pumping loss of the engine increases.

On the other hand, as illustrated by the broken line in FIG. 3C, the target EGR-valve opening remains at the first predetermined value EG1 corresponding to the fully-opened state also after the time t3. Also in the case where a feedback control is performed on the target EGR-valve opening corresponding to the second predetermined value APO2 of the accelerator operation amount so as to ensure the actual fresh air amount by increasing the supercharging pressure, the target EGR-valve opening cannot immediately follow the feedback control depending on the time when the integral correction value is cleared. Accordingly, this state where the fully-opened state is maintained might occur. Since the target EGR-valve opening is maintained in the fully-opened state, a sharp increase in exhaust pressure around the time t4 increases the EGR gas amount. This hinders the inflow of the actual fresh air amount. Due to the influence of this hindrance, as illustrated by the broken line in FIG. 3E, the actual fresh air amount temporarily decreases around a time t5 at the beginning of acceleration. Accordingly, the combustion of the air-fuel mixture within the cylinder deteriorates, and the engine torque temporarily decreases around a time t6 at the beginning of acceleration as illustrated by the broken line in FIG. 3G. This causes an acceleration failure so called a hesitation.

The inventors thus conceived an idea to remedy the acceleration failure without deteriorating the smoke by execution of all the following processes (1) to (3) during acceleration from the time t3 to the time t8 in FIGS. 3A-3G.

(1) Nozzle Opening Control During Acceleration

Figure 4A:
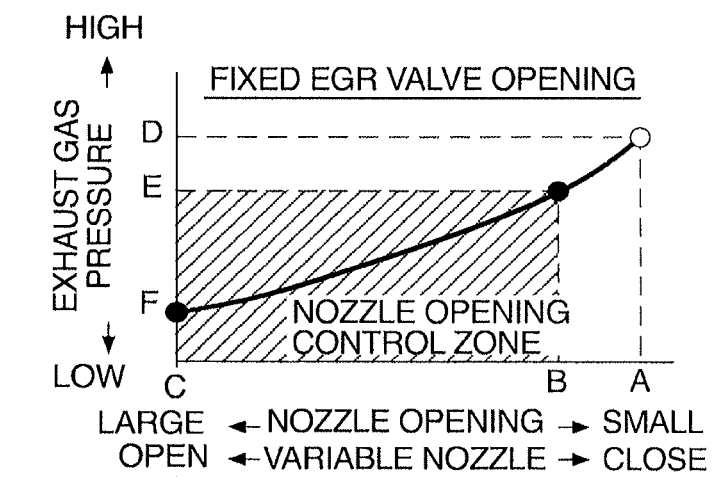
FIGS. 4A and 4B are diagrams showing characteristics of an exhaust pressure and an actual supercharging pressure with respect to a nozzle opening.
Figure 4B:
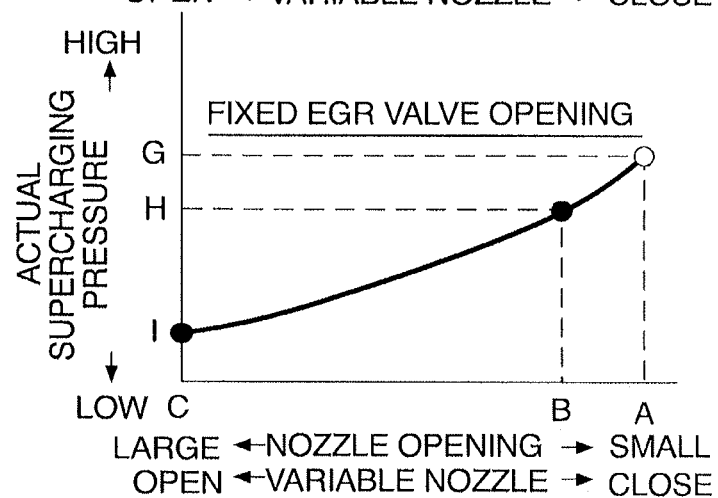

Referring to FIGS. 4A and 4B first, a nozzle opening control during acceleration will be described. FIG. 4A is a characteristic diagram of the exhaust pressure with respect to the nozzle opening in a state where the EGR-valve opening is held constant. FIG. 4B is a characteristic diagram of the actual supercharging pressure with respect to the nozzle opening in a state where the EGR-valve opening is held constant. The "actual supercharging pressure" is the intake air pressure in the intake passage 11 immediately at the downstream of the intercooler 22. As illustrated in FIG. 4A and FIG. 4B, in the state where the EGR-valve opening is held constant, the exhaust pressure and the actual supercharging pressure become greater as the nozzle opening becomes smaller.

Since the actual fresh air amount is desired to be increased during acceleration, the supercharging pressure is desired to be increased. Therefore, the nozzle opening is desired to be small as much as possible. However, like the reference example in FIG. 3B, when the variable nozzle is set to the fully-closed state, that is, an opening A in FIGS. 4A and 4B, the exhaust pressure sharply increases. Therefore, the variable nozzle is set to an opening B greater than the opening A such that the exhaust pressure does not sharply increase. Then, as illustrated in FIG. 4A, the exhaust pressure decreases from D to E. This state allows preventing the exhaust pressure from sharply increasing. Thus, in the region illustrated by hatching in FIG. 4A, the nozzle opening during acceleration is controlled. In this state, the actual supercharging pressure decreases from G to H.

(2) EGR-Valve-Opening Control During Acceleration

Figure 5A:
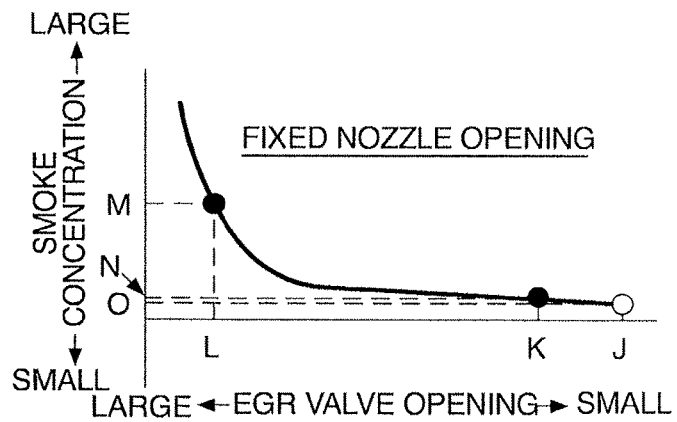
FIGS. 5A-5D are diagrams showing characteristics of a smoke concentration, an exhaust pressure, an intake-air excess air factor, and an actual fresh air amount with respect to an EGR-valve opening.
Figure 5B:
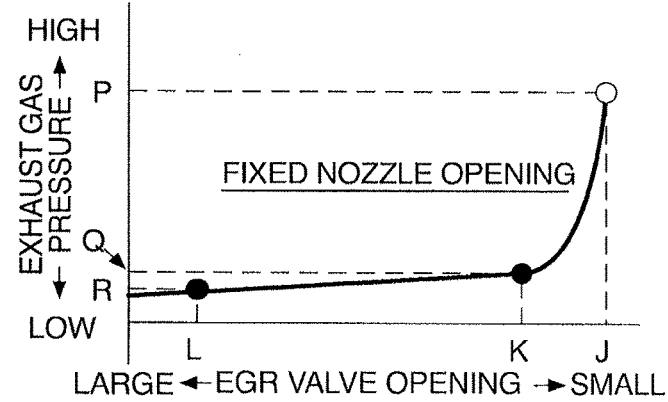
Figure 5C:
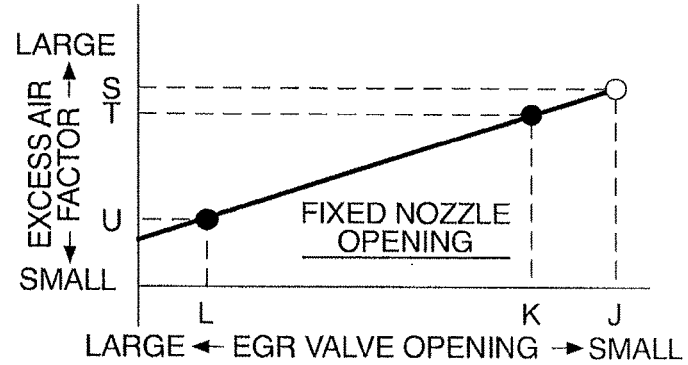
Figure 5D:
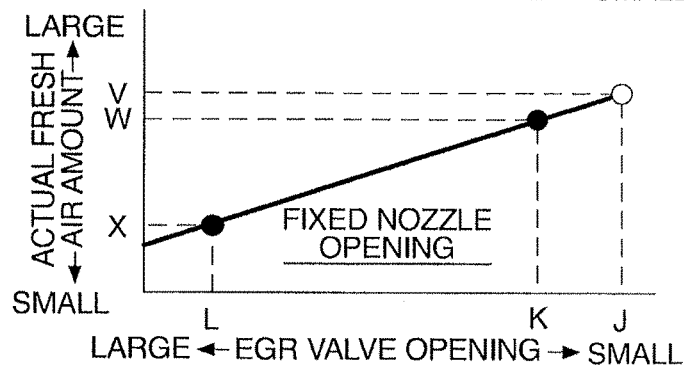

Referring to FIGS. 5A-5D next, an EGR-valve-opening control during acceleration will be described. To remedy the temporal decrease in actual fresh air amount because the EGR-valve opening is maintained in the fully-opened state (EG1) as in the case of the reference example, according this embodiment, the target EGR-valve opening is controlled to a closing side at the time t3 insofar as the exhaust pressure does not sharply increase. FIG. 5A is a characteristic diagram of smoke concentration with respect to the EGR-valve opening in the state where the nozzle opening is held constant. FIG. 5B is a characteristic diagram of the exhaust pressure with respect to the EGR-valve opening in the state where the nozzle opening is held constant. FIG. 5C is a characteristic diagram of an excess air factor (abbreviated to an "intake air $\lambda$" in the figure) of the intake air with respect to the EGR-valve opening in the state where the nozzle opening is held constant. FIG. 5D is a characteristic diagram of the actual fresh air amount with respect to the EGR-valve opening in the state where the nozzle opening is held constant.

As seen from FIG. 5A and FIG. 5D, when the EGR-valve opening is increased in the state where the nozzle opening is held constant, the actual fresh air amount decreases and then the smoke concentration increases.

As seen from FIG. 5B, when the EGR-valve opening is decreased in the state where the nozzle opening is held constant, the exhaust pressure increases.

As seen from FIG. 5C, when the EGR-valve opening is decreased in the state where the nozzle opening is held constant, the excess air factor $\lambda$ of the intake air increases. Herein, the "intake air" is the intake fresh air and the EGR gas that flow into the cylinder.

To reduce the increase in EGR gas amount during acceleration, the opening of the EGR valve is preferred to be decreased as much as possible. However, when the EGR valve becomes an opening J corresponding to the fully-closed state, the exhaust pressure is set to P with a large value. This increases the pumping loss of the engine as described above. Therefore, the EGR valve is restricted by an opening K, which is greater than the opening J, such that the exhaust pressure is not excessively increased. As a result, the exhaust pressure becomes equal to Q. The target EGR-valve opening during acceleration is thus set.

(3) Switching Between Control During Acceleration and Control During Normal Operation When acceleration is determined to take place at the time t3 in FIG. 3A, the control during normal operation is switched to the control during acceleration corresponding to (1) and (2) described above. At a time t8 after a lapse of a certain period of time from the time t3, the acceleration is assumed to be terminated and then the control returns to the control during normal operation. The timing of the termination of the acceleration may be determined based on the rotation speed of the turbocharger 21, the actual supercharging pressure, the engine rotation speed, the exhaust flow rate, and similar parameter. The rotation speed of the turbocharger 21 can be detected by a sensor. The exhaust flow rate can be obtained by the known method disclosed in JP2005-048738A, published by Japan Patent Office in 2005.

This allows simply determining the target nozzle opening B during acceleration in the state where the EGR-valve opening is held constant and the target EGR-valve opening K during acceleration in the state where the nozzle opening is held constant. However, in the actual control, it is necessary to simultaneously change the target nozzle opening and the target EGR-valve opening. Accordingly, it is difficult to simultaneously obtain the target nozzle opening during acceleration and the target EGR-valve opening during acceleration. Therefore, in this embodiment, a method for giving the respective target values will be examined using the timing charts in FIGS. 3A-3G.

Firstly, not to increase the EGR gas amount by a sharp increase of the exhaust pressure during acceleration, the target EGR-valve opening is switched from the first predetermined value EG1, which corresponds to the fully-opened state, to a second predetermined value EG2 at the time t3 in a stepwise manner. This second predetermined value EG2 is the target EGR-valve opening during acceleration, and is the opening that is opened slightly more than the fully-closed state. On the other hand, the target nozzle opening is switched from the first predetermined value VN1, which corresponds to the fully-opened state, to a third predetermined value VN3 in a stepwise manner at the time t3. This third predetermined value VN3 is the target nozzle opening during acceleration, and is the opening that is opened slightly more than the fully-closed state.

As just described, when the target EGR-valve opening during acceleration and the target nozzle opening during acceleration are given, the first predetermined value EX1 before acceleration can be changed to the second predetermined value EX2 during acceleration without sharply increasing the exhaust pressure as illustrated by the bold solid line in FIG. 3D.

Reducing the sharp increase in exhaust pressure during acceleration reduces the increase in EGR gas amount. Accordingly, as illustrated by the bold solid line in FIG. 3E, the actual fresh air amount increases without having a temporal decrease during acceleration. Then, the combustion deterioration of the air-fuel mixture within the cylinder does not occur. Accordingly, like the bold solid line in FIG. 3G, the engine torque increases without depression and the acceleration failure does not occur.

The target values of the nozzle opening and the EGR-valve opening are switched from the target values during normal operation to the target values during acceleration after the acceleration-determination timing at the time t3. In this case, it is preferred to put a higher priority on the instruction to the variable nozzle 21d than the instruction to the EGR valve 14.

The second predetermined value EX2 will be further described.

Since the target fuel injection amount Qsol increases during acceleration, the engine torque increases corresponding to an increase in the target fuel injection amount Qsol. An increased amount of the engine torque is herein defined as $\Delta Trq1$ (Nm). On the other hand, an increase in the exhaust pressure up to the second predetermined value EX2 increases the pumping loss of the engine. An increased amount of the pumping loss due to the increase in exhaust pressure is herein defined as $\Delta Trq2$ (Nm). The $\Delta Trq1$ needs to be greater than the $\Delta Trq2$ to obtain the torque required for acceleration. The second predetermined value EX2 is set at a value with which the torque $\Delta Trq1$, which is increased with an increase in the target fuel injection amount Qsol during acceleration, is greater than the increase $\Delta Trq2$ of the pumping loss, which is increased with the increase in the exhaust pressure to the second predetermined value EX2. In this context, the second predetermined value EX2 is defined as a "maximum exhaust pressure."

The maximum exhaust pressure EX2 is unambiguously determined when the driving condition is determined. The driving condition is determined by the target fuel injection amount Qsol, which is a synonym of an engine load, and an engine rotation speed Ne. A change in driving condition causes a change in the maximum exhaust pressure. Therefore, a maximum-exhaust-pressure map can be created using the target fuel injection amount Qsol and the engine rotation speed Ne as parameters by changing the target fuel injection amount Qsol and the engine rotation speed Ne so as to obtain the maximum exhaust pressure by adaptation.

In FIG. 3C, the target EGR-valve opening is reset to the fully-closed state (a third predetermined value EG3) in a stepwise manner at the time t8.

On the other hand, the target nozzle opening is reset to the second predetermined value VN2, which corresponds to the fully-closed state, gradually from a time t7 slightly before the time t8. This is to avoid the following situation. When the target nozzle opening is switched to the second predetermined value VN2 corresponding to the fully-closed state in a stepwise manner at the time t8, the exhaust pressure sharply increases as described above, then the pumping loss increases, and thus the engine torque decreases.

It should be noted that the target nozzle opening and the target EGR-valve opening differ between the control during normal operation before the time t3 and the control during normal operation after the time t8. This is because, mainly, the accelerator operation amount APO is different before the time t3 and after the time t8.

Figure 6:
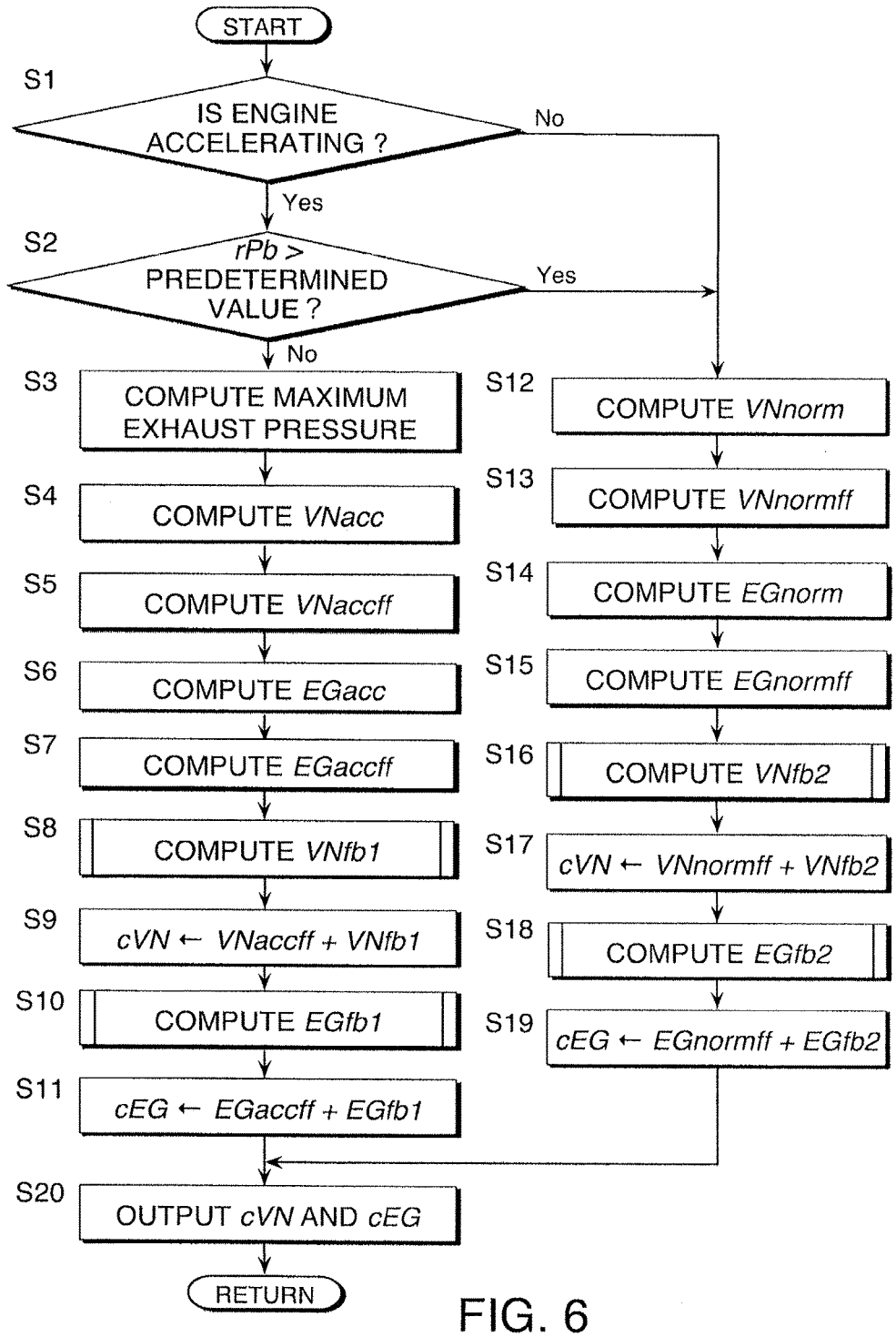
FIG. 6 is a flowchart illustrating a control process performed by an engine controller according to the first embodiment of this invention.

Referring to FIG. 6 next, a control process performed by the engine controller 31 will be described. The routine shown in FIG. 6 calculates a nozzle opening command value cVN and an EGR-valve opening command value cEG. The routine of FIG. 6 is executed at regular time intervals of, for example, 10 milliseconds. The description of the nozzle opening control during the interval from the time t7 to the time t8 in FIG. 3B is omitted herein.

In a step 1, the engine controller 31 determines whether or not the diesel engine 1 is accelerating. The determination is accomplished; for example, by determining whether or not an amount of change in accelerator operation amount per predetermined time is greater than a predetermined threshold value. When the determination is affirmative, the engine controller 31 performs the processing of a step 2 and when the determination is negative, the engine controller 31 performs the processing of a step 12.

In the step 2, the engine controller 31 determines whether or not an actual supercharging pressure rPb detected by a supercharging-pressure sensor 37 is greater than a predetermined value. This predetermined value is a supercharging pressure when the control during acceleration is terminated, and is previously determined. When the determination is negative, the engine controller 31 performs the processing of a step 3 and when the determination result is affirmative, the engine controller 31 performs the processing of the step 12.

In the step 3, the engine controller 31 applies the engine rotation speed Ne and the target fuel injection amount Qsol to a map so as to calculate the maximum exhaust pressure. The maximum exhaust pressure is the value that depends on the engine rotation speed and the target fuel injection amount Qsol. The maximum exhaust pressure is the upper limit value of the exhaust pressure such that the torque $\Delta Trq1$, which is increased with an increase in the target fuel injection amount during acceleration, is greater than the increased amount ΔTrq2 of the pumping loss, which is increased with an increase in the exhaust pressure.

Figure 7:
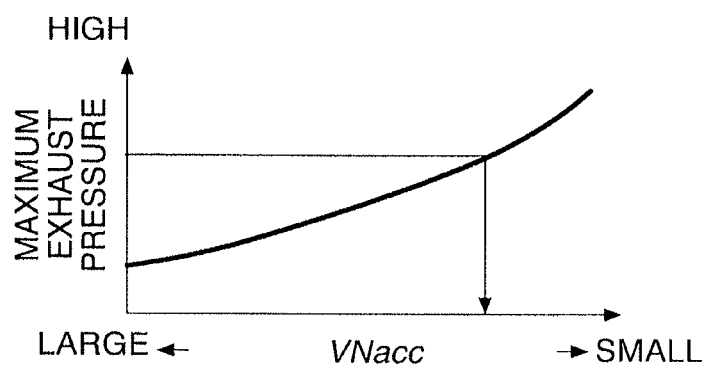
FIG. 7 is a diagram showing characteristics of a target-nozzle-opening basic value during acceleration.

In a step 4, the engine controller 31 applies this maximum exhaust pressure to a table illustrated in FIG. 7 so as to calculate a target-nozzle-opening basic value during acceleration VNacc. In a step 5, the engine controller 31 applies the target-nozzle-opening basic value during acceleration VNacc directly to a feed-forward amount VNaccff of the target nozzle opening during acceleration. This feed-forward amount VNaccff of the target nozzle opening during acceleration gives the target nozzle opening in the interval from the time t3 to the time t7 in FIG. 3B. Specifically, the feed-forward amount VNaccff of the target nozzle opening during acceleration is a value that is switched to the third predetermined value VN3 in a stepwise manner at the time t3 as illustrated by the bold solid line in FIG. 3B.

Figure 8:
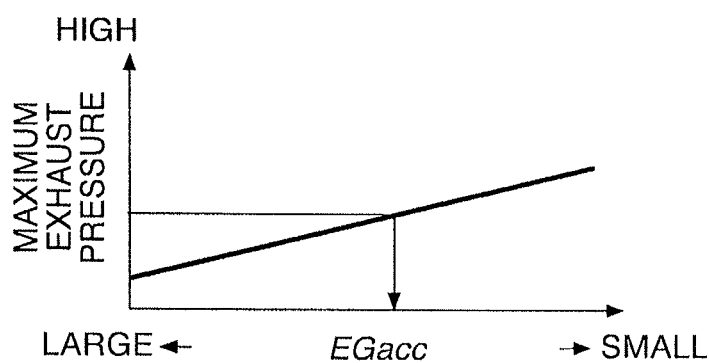
FIG. 8 is a diagram showing characteristics of a target-EGR-valve-opening basic value during acceleration.

In a step 6, the engine controller 31 applies the maximum exhaust pressure to a table illustrated in FIG. 8 so as to calculate a target-EGR-valve-opening basic value during acceleration EGacc. In a step 7, the engine controller 31 applies the target-EGR-valve-opening basic value during acceleration EGacc directly to a feed-forward amount EGaccff of the target EGR-valve opening during acceleration. This feed-forward amount EGaccff of the target EGR-valve opening during acceleration gives the target EGR-valve opening in the interval from the time t3 to the time t8 in FIG. 3C. Specifically, the feed-forward amount EGaccff of the target EGR-valve opening during acceleration is the value that is switched to the second predetermined value EG2 in a stepwise manner at the time t3 as illustrated by the bold solid line in FIG. 3C.

It should be noted that the characteristics shown in FIG. 7 and FIG. 8 are previously obtained by adaptation so as to obtain the maximum exhaust pressure.

Figure 9:
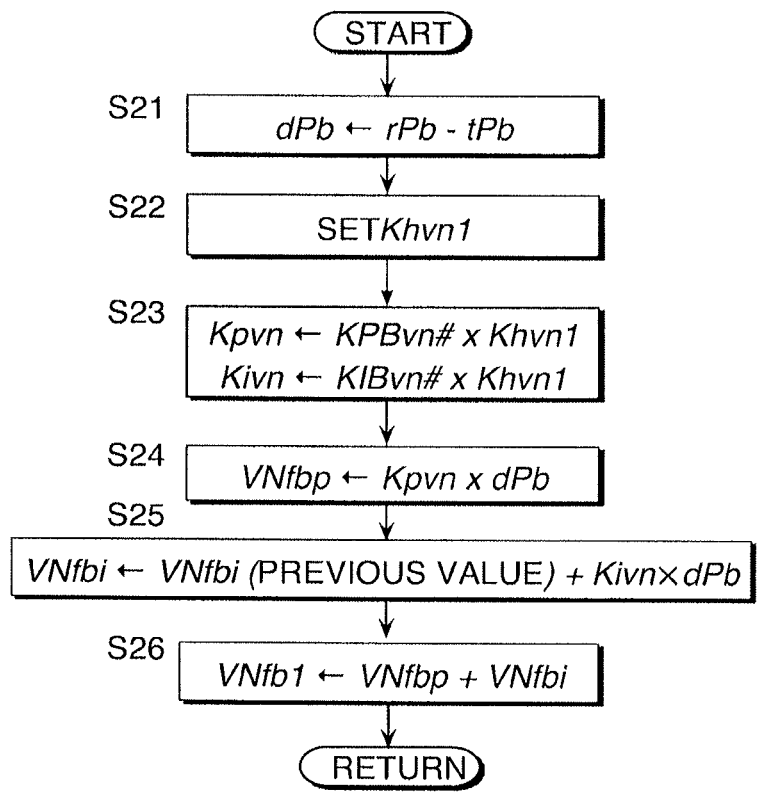
FIG. 9 is a flowchart illustrating a nozzle-opening feedback amount calculation routine during acceleration performed by the engine controller

In a step 8, the engine controller 31 calculates a feedback amount VNfb1 of the nozzle opening during acceleration. This will be described with reference to a flowchart in FIG. 9. FIG. 9 illustrates a routine for calculating the feedback amount VNfb1 of the nozzle opening during acceleration.

In a step 21, the engine controller 31 sets a value obtained by subtracting a target supercharging pressure tPb from the actual supercharging pressure rPb, which is detected by the supercharging-pressure sensor 37, as a control error dPb.

$$dPb = rPb - tPb \quad (1)$$

It should be noted that the target supercharging pressure tPb may be a predetermined constant value or may be a variable value depending on the engine rotation speed Ne and the target fuel injection amount Qsol as parameters.

In a step 22, the engine controller 31 calculates a correction coefficient Khvn1 of the feedback gain during acceleration.

In a step 23, the engine controller 31 calculates a feedback gain Kpvn by multiplying a proportional constant KPBvn# by the correction coefficient Khvn1. The engine controller 31 calculates a feedback gain Kivn by multiplying an integral constant KIBvn# by the correction coefficient Khvn1.

In a step 24, the engine controller 31 calculates a proportional correction value VNfbp by multiplying the control error dPb by the feedback gain Kpvn.

$$VNfbp = Kpvn \times dPb \quad (2)$$

In a step 25, the engine controller 31 calculates an integral correction value VNfbi with the following formula using the control error dPb and the feedback gain Kivn.

$$VNfbi = VNfbi(\text{previous value}) + Kivn \times dPb \quad (3)$$

In a step 26, the engine controller 31 sets the sum of the proportional correction value VNfbp and the integral correction value VNfbi as the feedback amount VNfb1 of the nozzle opening during acceleration.

$$VNfb1 = VNfbp + VNfbi \quad (4)$$

The correction coefficient Khvn1 of the feedback gain during acceleration enhances the acceleration response and thus is greater than a correction coefficient Khvn2 of the feedback gain during normal operation described later. With the introduction of the feedback amount VNfb1 of the nozzle opening during acceleration using this correction coefficient Khvn1 of the feedback gain, the actual supercharging pressure changes approximately corresponding to the actual fresh air amount illustrated by the bold solid line in FIG. 3E during acceleration. That is, an actual fresh air amount Qac corresponding to the actual supercharging pressure and the target fresh air amount tQac corresponding to the target supercharging pressure increase since the time t3. The actual fresh air amount Qac corresponding to the actual supercharging pressure significantly changes compared with the target fresh air amount tQac corresponding to the target supercharging pressure, overshoots, and then converges to the target fresh air amount tQac. Therefore, in the acceleration state, the correction coefficient Khvn1 of the feedback gain during acceleration is adapted in advance such that the actual supercharging pressure rPb follows the target supercharging pressure tPb but does not exceed a value corresponding to the maximum exhaust pressure. It should be noted that the feedback control on the nozzle opening during acceleration may be prohibited insofar as the actual supercharging pressure rPb can follow the target supercharging pressure tPb without exceeding the value corresponding to the maximum exhaust pressure by applying only the target-nozzle-opening basic value during acceleration VNacc or the feed-forward amount VNaccff of the target nozzle opening during acceleration in the nozzle opening control.

Figure 10:
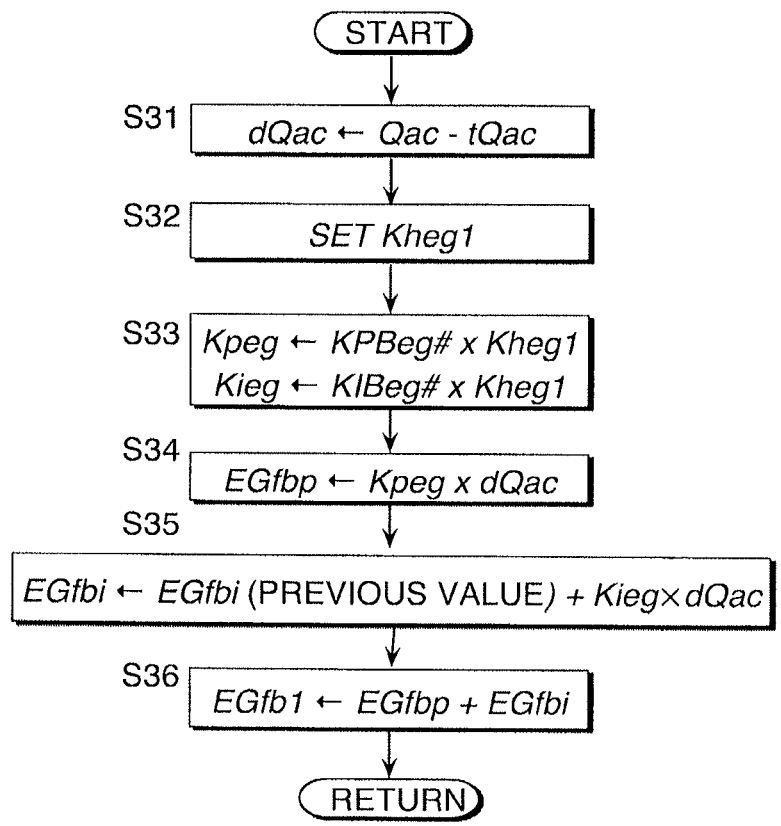
FIG. 10 is a flowchart illustrating an EGR-valve-opening feedback amount calculation routine during acceleration performed by the engine controller.

The description of the routine of FIG. 10 FIG. 9 is herein terminated. In FIG. 9, the feedback amount VNfb1 of the nozzle opening during acceleration is calculated such that the actual supercharging pressure rPb coincides with the target supercharging pressure tPb. This calculation may be performed differently. For example, the feedback amount VNfb1 of the nozzle opening during acceleration may be calculated such that the actual fresh air amount Qac coincides with the target fresh air amount tQac.

The description of the routine of FIG. 6 will be resumed.

In a step 9, the engine controller 31 adds the feedback amount VNfb1 of the nozzle opening during acceleration to the feed-forward amount VNaccff of the target nozzle opening during acceleration so as to calculate the nozzle opening command value cVN.

$$cVN = VNaccff + VNfb1 \quad (5)$$

In a step 10, the engine controller 31 calculates a feedback amount EGfb1 of the EGR-valve opening during acceleration. This calculation will be described with reference to a flowchart in FIG. 10. FIG. 10 illustrates a routine for calculating the feedback amount EGfb1 of the EGR-valve opening during acceleration.

In a step 31, the engine controller 31 calculates a value obtained by subtracting the target fresh air amount tQac from the actual fresh air amount Qac as a control error dQac.

$$dQac = Qac - tQac \quad (6)$$

It should be noted that the actual fresh air amount Qac and the target fresh air amount tQac can be obtained by the known method disclosed in above-described JP2001-132463A.

In a step 32, the engine controller 31 calculates a correction coefficient Kheg1 of the feedback gain during acceleration.

In a step 33, the engine controller 31 calculates a feedback gain Kpeg by multiplying a proportional constant KPBeg# by the correction coefficient Kheg1. The engine controller 31 calculates a feedback gain Kieg by multiplying an integral constant KIBeg# by the correction coefficient Kheg1.

In a step 34, the engine controller 31 calculates a proportional correction value EGfbp by multiplying the control error dQac by the feedback gain Kpeg.

$$EGfbp = Kpeg \times dQac \qquad (7)$$

In a step 35, the engine controller 31 calculates an integral correction value EGfbi using the control error dQac and the feedback gain Kieg.

$$EGfbi = EGfbi(\text{previous value}) \times dQac \qquad (8)$$

In a step 36, the engine controller 31 sets the sum of the proportional correction value EGfbp and the integral correction value EGfbi as the feedback amount EGfb1 of the EGR-valve opening during acceleration.

$$Egfb1 = EGfbp + EGfbi \qquad (9)$$

The correction coefficient Kheg1 of the feedback gain during acceleration enhances the acceleration response and thus is greater than a correction coefficient Kheg2 of the feedback gain during normal operation described later. With the introduction of the feedback amount EGfb1 of the EGR-valve opening during acceleration using this correction coefficient Kheg1 of the feedback gain, the actual fresh air amount changes as illustrated by the bold solid line in FIG. 3E. That is, the actual fresh air amount Qac corresponding to the actual supercharging pressure and the target fresh air amount tQac corresponding to the target supercharging pressure increases since the time t3. The actual fresh air amount Qac corresponding to the actual supercharging pressure significantly changes compared with the target fresh air amount tQac corresponding to the target supercharging pressure, overshoots, and then converges to the target fresh air amount tQac. Therefore, in the acceleration state, the correction coefficient Kheg1 of the feedback gain during acceleration is adapted in advance such that the actual fresh air amount Qac follows the target fresh air amount tQac without exceeding a value corresponding to the maximum exhaust pressure. The feedback gain during acceleration is the integral gain of the feedback control on the control variable of the EGR valve during acceleration.

The description of the routine of FIG. 10 is herein terminated.

The description of the return of FIG. 6 will be resumed.

In a step 11, the engine controller 31 adds the feedback amount EGfb1 of the EGR-valve opening during acceleration to the feed-forward amount EGaccff of the target EGR-valve opening during acceleration so as to calculate the EGR-valve opening command value cEG.

$$cEG = EGaceff + EGfb1 \qquad (10)$$

The engine controller 31 terminates the control during acceleration when the actual supercharging pressure rPb exceeds the predetermined value in the step 2 and thus causes the process to proceed to the step 12. Also, when the diesel engine 1 is not accelerating in the step 1, the engine controller 31 performs the processing of the step 12.

In the step 12, the engine controller 31 applies the target fresh air amount tQac and the actual EGR amount Qec to a map so as to calculate a target-nozzle-opening basic value VNnorm during normal operation. In a step 13, the engine controller 31 sets a feed-forward amount VNnormff of the target nozzle opening during normal operation equal to the target-nozzle-opening basic value VNnorm. This feed-forward amount VNnormff of the target nozzle opening during normal operation gives the target nozzle opening in the intervals before t3 and after t8 in FIG. 3B.

In a step 14, the engine controller 31 applies the engine rotation speed Ne and the target fuel injection amount Qsol to a map so as to calculate a normal-time target-EGR-valve-opening basic value EGnorm. In a step 15, the engine controller 31 sets a feed-forward amount EGnormff of the target EGR-valve opening during normal operation equal to the normal-time target-EGR-valve-opening basic value EGnorm. This feed-forward amount VNnormff of the target nozzle opening during normal operation gives the target EGR-valve opening in the intervals before t3 and after t8 in FIG. 3C.

It should be noted that the methods for calculating the target nozzle-valve-opening basic value VNnorm during normal operation and the normal-time target-EGR-valve-opening basic value EGnorm are not limited to the above-described methods. Instead of the actual EGR amount Qec, an actual EGR rate Megrd may be used to calculate the target nozzle-valve-opening basic value VNnorm during normal operation. It should be noted that the actual EGR amount Qec can be calculated by a known method as disclosed in above-described JP2001-132463A.

Figure 11:
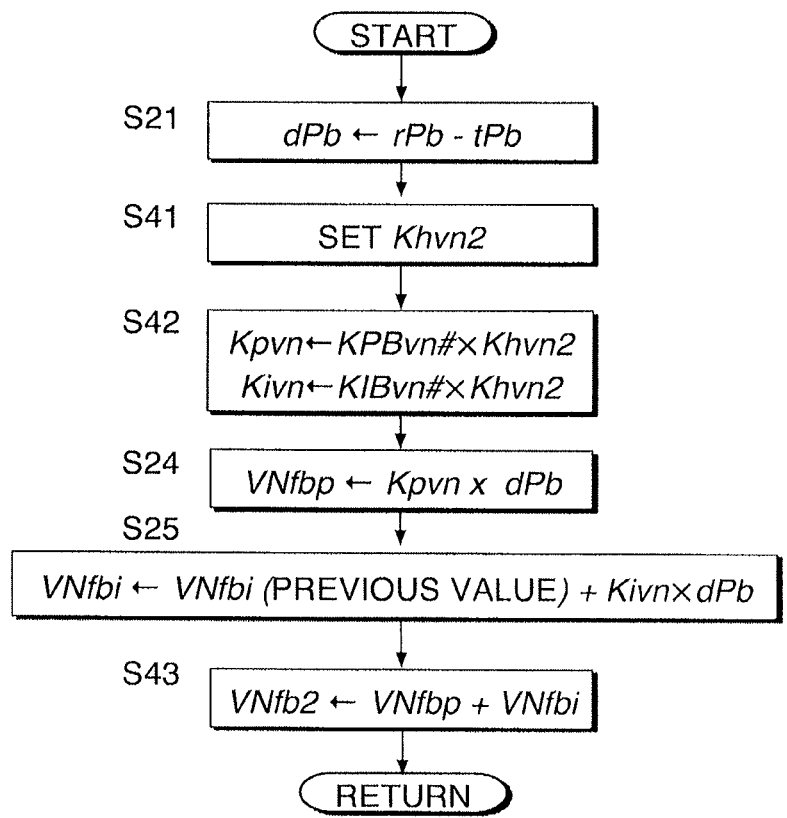
FIG. 11 is a flowchart illustrating a nozzle-opening feedback amount calculation routine during normal operation performed by the engine controller.

In a step 16, the engine controller 31 calculates a feedback amount VNfb2 of the nozzle opening during normal operation. This calculation will be described with reference to a flowchart in FIG. 11. FIG. 11 illustrates a routine for calculating the feedback amount VNfb2 of the nozzle opening during normal operation. With respect to the steps of the routine of FIG. 11 that have the same contents as those of the routine of FIG. 9 are given identical step numbers.

The difference between the routines of FIG. 9 and FIG. 11 will be mainly described.

In a step 41, the engine controller 31 calculates the correction coefficient Khvn2 of the feedback gain during normal operation.

In a step 42, the engine controller 31 calculates the feedback gain Kpvn by multiplying a proportional constant KPBvn# by the correction coefficient Khvn2. The engine controller 31 calculates the feedback gain Kivn by multiplying an integral constant KIBvn# by the correction coefficient Khvn2.

In a step 43, the engine controller 31 sets the sum of the proportional correction value VNfbp and the integral correction value VNfbi as the feedback amount VNfb2 of the nozzle opening during normal operation.

$$VNfb2 = VNfbp + VNfbi \qquad (11)$$

The correction coefficient Khvn2 of the feedback gain during normal operation is smaller than the correction coefficient Khvn1 of the feedback gain during acceleration.

The description of the routine of FIG. 6 will be resumed.

In a step 17, the engine controller 31 adds the feedback amount VNfb2 of the nozzle opening during normal operation to the feed-forward amount VNnormff of the target nozzle opening during normal operation so as to calculate the nozzle opening command value cVN.

$$cVN = VNnormff + VNfb2 \quad (12)$$

Figure 12:
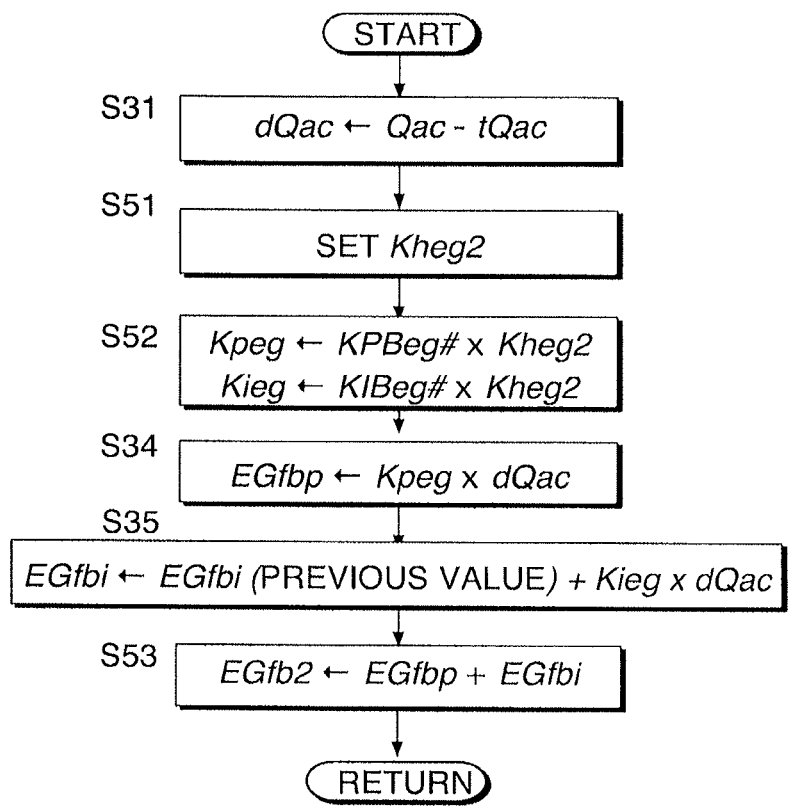
FIG. 12 is a flowchart illustrating an EGR-valve-opening feedback amount calculation routine during normal operation by the engine controller.

In a step 18, the engine controller 31 calculates a feedback amount EGfb2 of the EGR-valve opening during normal operation. This calculation will be described with reference to a flowchart in FIG. 12. FIG. 12 illustrates a routine for calculating the feedback amount EGfb2 of the EGR-valve opening during normal operation. With respect to the steps of the routine of FIG. 15 FIG. 12 that have the same contents as those of the routine of FIG. 9 are given identical step numbers.

The difference between the routines of FIG. 9 and FIG. 12 will be mainly described.

In a step 51, the engine controller 31 calculates the correction coefficient Kheg2 of the feedback gain during normal operation.

In a step 52, the engine controller 31 calculates the feedback gain Kpeg by multiplying the proportional constant KPBeg# by the correction coefficient Kheg2. The engine controller 31 calculates the feedback gain Kieg by multiplying the integral constant KIBeg# by the correction coefficient Kheg2.

In a step 53, the engine controller 31 calculates the sum of the proportional correction value EGfbp and the integral correction value EGfbi as the feedback amount EGfb2 of the EGR-valve opening.

$$EGfb2 = EGfbp + EGfbi \quad (13)$$

The correction coefficient Kheg2 of the feedback gain during normal operation is smaller than the correction coefficient Kheg1 of the feedback gain during acceleration.

The description of the routine of FIG. 6 will be resumed.

In a step 19, the engine controller 31 adds the feedback amount EGfb2 of the EGR-valve opening during normal operation to the feed-forward amount EGnormff of the normal-time target EGR-valve opening so as to calculate the EGR-valve opening command value cEG.

$$cEG = EGnormff + EGfb2 \quad (14)$$

In a step 20, the engine controller 31 outputs the nozzle opening command value cVN and the EGR-valve opening command value cEG.

While the flowchart is omitted, the engine controller 31 further converts the nozzle opening command value cVN into the number of steps for the step motor 21c. Then, the engine controller 31 drives the step motor 21c based on this number of steps. Also, the engine controller 31 converts the EGR-valve opening command value cEG into the number of steps for a step motor 14c for EGR valve. Then, the engine controller 31 drives the step motor 14c for EGR valve based on this number of steps.

In the first embodiment, the case where the target nozzle opening and the target EGR-valve opening are calculated has been described. However, this calculation may be performed differently. For example, instead of the target nozzle opening, a target nozzle opening area or a target nozzle opening area ratio may be used. Instead of the target EGR-valve opening, a target EGR-valve opening area may be used. The target nozzle opening area ratio during normal operation and the target EGR-valve opening area during normal operation can be calculated by the known methods disclosed in above-described JP2001-132463A.

Next, the operation and effect of this embodiment will be described.

This embodiment provides the variable geometry turbocharger 21, which has the variable nozzle 21d as a variable supercharge pressure mechanism, and the EGR valve 14, which adjusts the EGR gas amount. When the diesel engine 1 is determined to be accelerating, the increased amount of the engine torque by increasing the fuel injection amount associated with the acceleration is set to be greater than the increased amount of the pumping loss, which is increased with an increase in the exhaust pressure due to the actuation of the variable nozzle 21d associated with the acceleration. That is, as illustrated in steps 1 to 4 and 6 in FIG. 6, the maximum exhaust pressure is set so as to control the target-nozzle-opening basic value during acceleration VNacc as the target value of the control variable for the variable supercharge pressure mechanism and the target-EGR-valve-opening basic value during acceleration EGacc as the target value of the control variable for the EGR valve. Accordingly, the engine torque promptly increases without being decreased during acceleration of the engine. This allows reducing the deterioration of smoke without causing an acceleration failure.

According to this embodiment, as illustrated in the steps 3 and 4 in FIG. 6, the target-nozzle-opening basic value during acceleration VNacc as the target value of the control variable for the variable supercharge pressure mechanism is calculated such that the actual supercharging pressure is greater than the predetermined supercharging pressure but does not exceed the value corresponding to the maximum exhaust pressure. This embodiment thereby suppresses the rapid increase in the exhaust pressure and the increase in the pumping loss.

This embodiment comprises a nozzle-opening feedback control unit (cf. FIG. 9) as a supercharging-pressure-control-mechanism controlled-variable feedback control unit, which performs the feedback control of the nozzle opening as the control variable for a supercharging-pressure control mechanism such that the actual supercharging pressure rPb coincides with the target supercharging pressure tPb. When the diesel engine 1 is determined to be accelerating, as illustrated in the steps 22 and 23 in FIG. 9 and in the steps 41 and 42 in FIG. 11, the correction coefficient of the feedback gain of the nozzle opening, which is the feedback gain of the feedback control of the supercharging pressure, is switched from Khvn2 to Khvn1 such that the supercharging pressure follows the target supercharging pressure tPb and does not exceed the value corresponding to the maximum exhaust pressure. Accordingly, compared with the case where the correction coefficient of the feedback gain of the nozzle opening is not switched even when the diesel engine 1 is accelerating, or in other words, in the case where the correction coefficient of the feedback gain of the nozzle opening is set to be the same as that during normal operation even when the diesel engine 1 is accelerating, the following ability of the actual supercharging pressure rPb to the target supercharging pressure tPb is improved.

According to this embodiment, as illustrated in the steps 3 and 6 in FIG. 6, the target-EGR-valve-opening basic value during acceleration EGacc as the target value of the control variable for the EGR valve is calculated such that the target-EGR-valve-opening basic value during acceleration EGacc does not exceed the value corresponding to the maximum exhaust pressure whereas the excess air factor of the intake air is greater than the predetermined value. This setting suppresses the generation of smoke and the deterioration of combustion while preventing the pumping loss from being increased.

This embodiment provides an EGR-valve-opening feedback control unit (in FIG. 10) as an EGR-valve controlled-variable feedback control unit, which performs feedback control of the EGR-valve opening. The EGR-valve opening is a control variable for the EGR valve and includes the integral correction value EGfbi that makes the actual fresh air amount Qac coincide with the target fresh air amount tQac. As illustrated in the steps 32 and 33 in FIG. 10 and in the steps 51 and 52 in FIG. 12, when the diesel engine 1 is determined to be accelerating, the correction coefficient of the feedback gain of the EGR-valve opening, which is the integral gain of the feedback control of the control variable for the EGR valve, is switched from Kheg2 to Kheg1, such that the actual fresh air amount Qac follows the target fresh air amount tQac but does not to exceed the value corresponding to the maximum exhaust pressure. Accordingly, compared with the case where the correction coefficient of the feedback gain of the EGR-valve opening is not switched even when the diesel engine 1 is accelerating, or in other words, in the case where the correction coefficient of the feedback gain of the EGR-valve opening is set to be the same as that during normal operation even when the diesel engine 1 is accelerating, the following ability of the actual fresh air amount Qac to the target fresh air amount tQac can be improved According to the first embodiment, the description has been given of the case where the correction coefficient of the feedback gain of the EGR-valve opening, which is the integral gain of the feedback control of the control variable for the EGR valve, is switched such that the actual fresh air amount Qac follows the target fresh air amount tQac but does not exceed the value corresponding to the maximum exhaust pressure when the diesel engine 1 is determined to be accelerating. However, this invention is not limited to the switching of the integral gain. For example, when the engine 1 is determined to be accelerating, the integral correction value EGfb1 may be cleared, or in other words, set to zero such that the actual fresh air amount Qac follows the target fresh air amount tQac but does not to exceed the value corresponding to the maximum exhaust pressure.

Second Embodiment

FIGS. 13A-13F are timing charts of parameters during acceleration such as the accelerator position, the target nozzle opening, and the target EGR-valve opening of the diesel engine 1 according to a second embodiment of this invention.

In the first embodiment, as illustrated by the bold solid line in FIG. 3B, the given feed-forward amount of the target nozzle opening during acceleration causes switching the target nozzle opening from the first predetermined value VN1 to the third predetermined value VN3 in a stepwise manner at the timing of t3 when the diesel engine 1 is determined to be accelerating. In contrast, in the second embodiment, as illustrated by the single-dotted line in FIG. 13B, a first-order delay feed-forward amount of the target nozzle opening during acceleration is given at the time t3 when the diesel engine 1 is determined to be accelerating.

Figure 14:
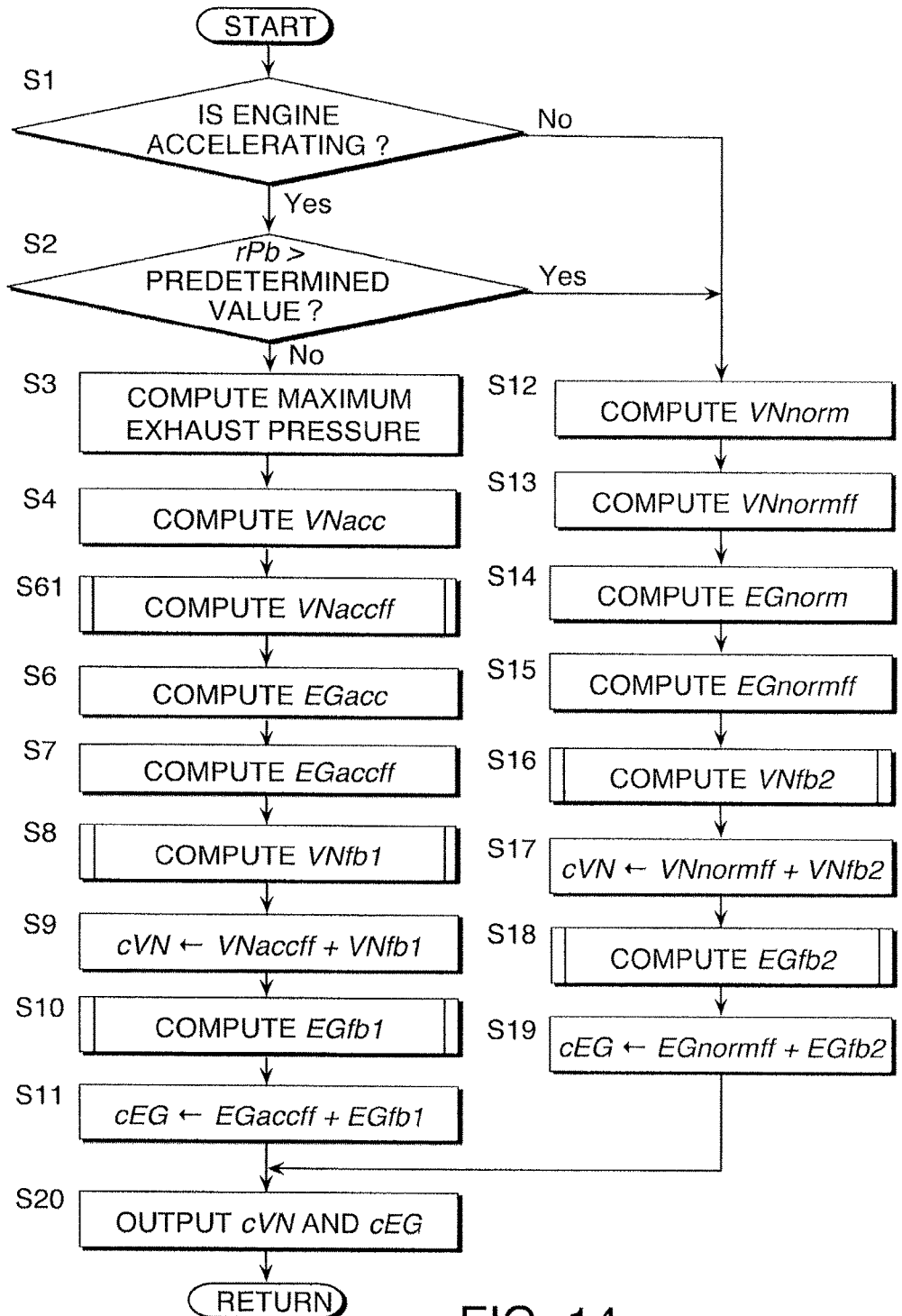
FIG. 14 is a flowchart illustrating a control process performed by an engine controller according to the second embodiment of this invention.
Figure 15:
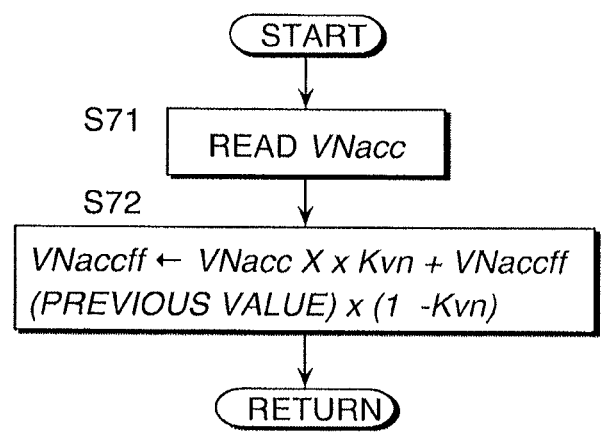
FIG. 15 is a flowchart illustrating a target-nozzle-opening feed-forward amount calculation routine during acceleration performed by the engine controller according to the second embodiment.

FIG. 14 illustrates a routine for calculating the nozzle opening command value cVN and the EGR-valve opening command value cEG according to the second embodiment. This routine is executed at regular time intervals of, for example, 10 milliseconds. With respect to the steps of this routine that have the same contents as those of the routine of FIG. 6 are given identical step numbers. The only difference of this routine from that of FIG. 6 is a step 61. The processing of this step will be described with reference to a flowchart shown in FIG. 15. FIG. 15 illustrates the routine for calculating the feed-forward amount VNaccff of the target nozzle opening during acceleration.

In a step 71, the engine controller 31 reads the target-nozzle-opening basic value during acceleration VNacc.

In a step 72, the engine controller 31 calculates the feed-forward amount VNaccff of the target nozzle opening during acceleration using the target-nozzle-opening basic value during acceleration VNacc and a weighted-average coefficient Kvn.

$$VNaccff = VNacc \times Kvn + VNaccff(\text{previous value}) \times (1 - Kvn) \quad (15)$$

where, Kvn=weighted-average coefficient.

Equation (15) gives a first-order delay feed-forward amount VNaccff of the target nozzle opening during acceleration. The weighted-average coefficient Kvn is determined in advance by adaptation.

According to the second embodiment, as illustrated in the step 61 of FIG. 14 and in FIG. 15, the first-order delay feed-forward amount VNaccff of the target nozzle opening during acceleration as the target value of the control variable for the variable supercharge pressure mechanism is given such that the actual supercharging pressure rPb is greater than the predetermined supercharging pressure but does not exceed the value corresponding to the maximum exhaust pressure. This allows further reducing the rapid increase in exhaust pressure and the increase in pumping loss compared with the case where the feed-forward amount VNaccff of the target nozzle opening during acceleration as the target value of the control variable for the variable supercharge pressure mechanism is switched in a stepwise manner at the timing when the diesel engine 1 is determined to be accelerating.

According to the second embodiment, the feed-forward amount VNaccff of the target nozzle opening during acceleration is given with a first-order delay. However, the delay processing is not limited to the first-order delay. For example, as illustrated by the double-dotted line in FIG. 13B, the feed-forward amount VNaccff may be given with a delay represented by a straight line with a gradient.

As described above, the feed-forward amount VNaccff of the target nozzle opening during acceleration as the target value of the control variable for the variable supercharge pressure mechanism is given by the value that gradually becomes greater such that the actual supercharging pressure rPb becomes greater than the predetermined supercharging pressure but does not exceed the value corresponding to the maximum exhaust pressure. Also in this case, the rapid increase in the exhaust pressure is further reduced compared with the case where the feed-forward amount VNaccff of the target nozzle opening during acceleration as the target value of the control variable for the variable supercharge pressure mechanism is switched in a stepwise manner at the timing when the diesel engine 1 is determined to be accelerating.

Third Embodiment

FIGS. 16A-16F are timing charts of the parameters during acceleration of the diesel engine 1 such as the accelerator operation amount, the target nozzle opening, and the target EGR-valve opening according to a third embodiment of this invention.

In the first embodiment, as illustrated by the bold solid line in FIG. 3C, the given feed-forward amount of the target EGR-valve opening during acceleration causes switching the target EGR-valve opening from the first predetermined value EG1 to the second predetermined value EG2 in a stepwise manner at the time t3 when the diesel engine 1 is determined to be accelerating. In contrast, according to the third embodiment, as illustrated by the broken line in FIG.

16C, a first-order delay feed-forward amount of the target EGR-valve opening during acceleration is given at the time t3 when the diesel engine 1 is determined to be accelerating.

Figure 17:
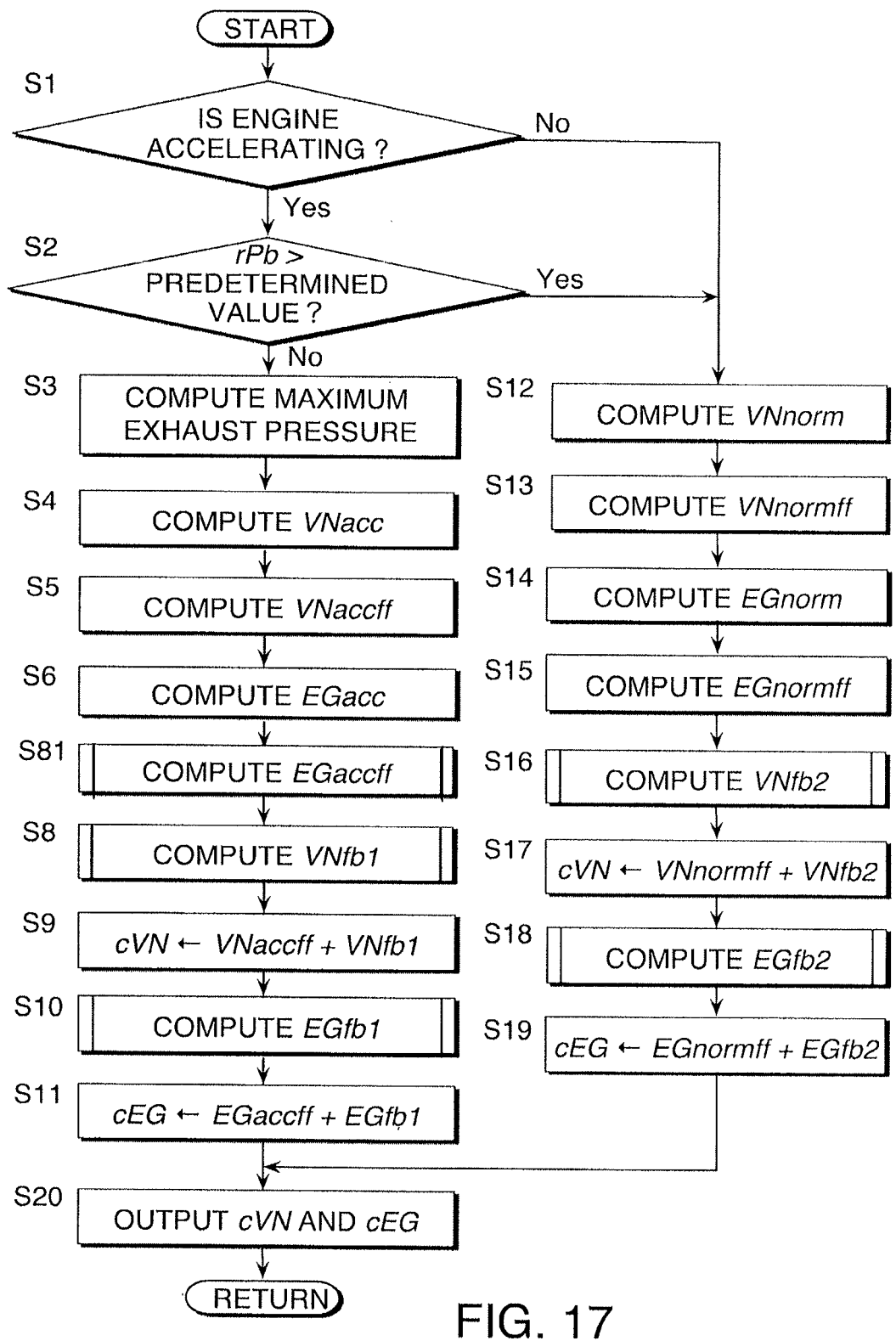
FIG. 17 is a flowchart illustrating a control processes performed by an engine controller according to the third embodiment of this invention.
Figure 18:
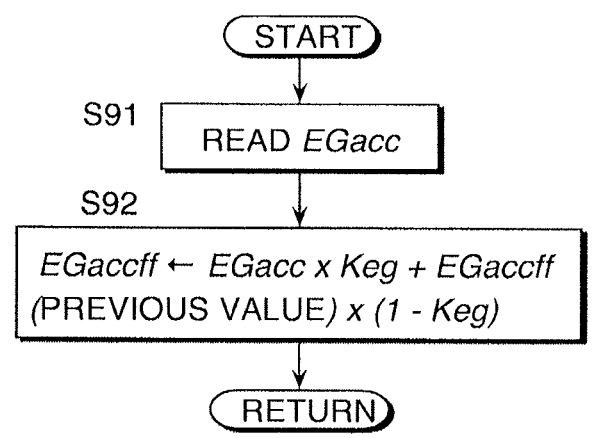
FIG. 18 is a flowchart of a target-EGR-valve-opening feed-forward amount calculation routine during acceleration performed by the engine controller according to the third embodiment.

FIG. 17 illustrates a routine for calculating the nozzle opening command value cVN and the EGR-valve opening command value cEG according to the third embodiment. The routine is executed by the engine controller 31 at regular time intervals of, for example, 10 milliseconds. With respect to the steps of this routine that have the same contents as those of the routine of FIG. 6 are given identical step numbers. The only difference of this routine from that of FIG. 6 is a step 81. The processing in this step will be described with reference to a flowchart shown in FIG. 18. FIG. 18 illustrates a routine for calculating the feed-forward amount EGaccff of the target EGR-valve opening during acceleration.

In a step 91, the engine controller 31 reads the target-EGR-valve-opening basic value during acceleration EGacc.

In a step 92, the engine controller 31 calculates the feed-forward amount EGaccff of the target EGR-valve opening during acceleration using the target-EGR-valve-opening basic value during acceleration EGacc and a weighted-average coefficient Keg.

$$EGaccff = EGacc \times Keg + EGaccff(\text{previous value}) \times (1 - Keg) \quad (16)$$

where, Keg=weighted-average coefficient.

Equation (16) gives a first-order delay feed-forward amount EGaccff of the target EGR-valve opening during acceleration. The weighted-average coefficient Keg is previously determined by adaptation.

According to the third embodiment, as illustrated in the step 81 of FIG. 17 and in FIG. 18, the first-order delay feed-forward amount EGaccff of the target EGR-valve opening during acceleration as the target value of the control variable for the EGR valve is given such that the actual supercharging pressure rPb is greater than the predetermined supercharging pressure but does not exceed the value corresponding to the maximum exhaust pressure. This allows further reducing the increase in the pumping loss, the deterioration of the smoke, and the combustion deterioration compared with the case where the feed-forward amount EGaccff of the target EGR-valve opening during acceleration as the target value of the control variable for the EGR valve is switched in a stepwise manner at the timing when the diesel engine 1 is determined to be accelerating.

Although this invention has been described above with reference to certain embodiments, this invention is not limited to the embodiments described above. Modifications and variations of the embodiments described above will occur to those skilled in the art, within the scope of the claims.

For example, in the embodiments described above, the variable geometry turbocharger 21 with the variable nozzle 21d has been described as the variable supercharge pressure mechanism. However, the variable supercharge pressure mechanism is not limited to the variable geometry turbocharger 21 with the variable nozzle 21d. For example, the variable supercharge pressure mechanism may be constituted by a constant capacity turbocharger with a wastegate valve. In this case, instead of the nozzle opening, the valve opening of the wastegate valve is controlled.

The features of the embodiments described above may be appropriately combined.

The contents of Tokugan 2012-175105, with a filing date of Aug. 7, 2012 in Japan, are hereby incorporated by reference.

The invention claimed is:

1. A control device for a diesel engine, comprising:
a variable geometry supercharger with a variable supercharge pressure mechanism;
an exhaust gas recirculation valve configured to adjust an exhaust gas recirculation amount, and
a programmable controller programmed to:
when the engine is determined to be accelerating, set a maximum exhaust pressure that causes an increased amount of an engine torque by increasing a fuel injection amount in association with acceleration to be greater than an increased amount of pumping loss increased with increasing exhaust pressure due to an actuation of the variable supercharge pressure mechanism in association with the acceleration, and control a target value of a control variable for the variable supercharge pressure mechanism and a target value of a control variable for the exhaust gas recirculation valve on the basis of the maximum exhaust pressure.

2. The control device for the diesel engine according to claim 1, wherein the controller is further programmed to calculate the target value of the control variable for the variable supercharge pressure mechanism such that an actual supercharging pressure is greater than a predetermined supercharging pressure but does not exceed a value corresponding to the maximum exhaust pressure.

3. The control device for the diesel engine according to claim 2, wherein the controller is further programmed to give the target value of the control variable for the variable supercharge pressure mechanism as a first-order delay value such that the actual supercharging pressure is greater than the predetermined supercharging pressure but does not exceed a value corresponding to the maximum exhaust pressure.

4. The control device for the diesel engine according to claim 2, wherein the controller is further programmed to give the target value of the control variable for the variable supercharge pressure mechanism as a gradually increasing value such that the actual supercharging pressure is greater than the predetermined supercharging pressure but does not exceed a value corresponding to the maximum exhaust pressure.

5. The control device for the diesel engine according to claim 2,
wherein the controller is further programmed to perform a feedback control of the control variable for the variable supercharge pressure mechanism such that the actual supercharging pressure coincides with a target supercharging pressure,
when the engine is determined to be accelerating, change a feedback gain of the feedback control of the control variable for the variable supercharge pressure mechanism such that the actual supercharging pressure follows the target supercharging pressure but does not exceed a value corresponding to the maximum exhaust pressure.

6. The control device for the diesel engine according to claim 1, wherein the controller is further programmed to calculate the target value of the control variable for the exhaust gas recirculation valve so as not to exceed a value corresponding to the maximum exhaust pressure while an excess air factor of intake air is greater than a predetermined value.

7. The control device for the diesel engine according to claim 1, wherein the controller is further programmed to give the target value of the control variable for the exhaust gas recirculation valve as a first-order delay value such that an actual supercharging pressure is greater than a predetermined supercharging pressure but does not exceed a value corresponding to the maximum exhaust pressure.

8. The control device for the diesel engine according to claim 1,
  wherein the controller is further programmed to perform a feedback control of the control variable for the exhaust gas recirculation valve using an integral correction value such that an actual fresh air amount supplied to the engine coincides with a target fresh air amount, and
  when the engine is determined to be accelerating, change an integral gain of the feedback control of the control variable for the exhaust gas recirculation valve or clear the integral correction value so as to cause the actual fresh air amount to follow the target fresh air amount but not to exceed a value corresponding to the maximum exhaust pressure.

* * * * *